(12) United States Patent  (10) Patent No.: US 7,705,893 B2
Kinoshita  (45) Date of Patent: Apr. 27, 2010

(54) IMAGING APPARATUS AND FLICKER REDUCTION METHOD

(75) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1107 days.

(21) Appl. No.: 10/885,364

(22) Filed: Jul. 6, 2004

(65) Prior Publication Data

US 2005/0046704 A1   Mar. 3, 2005

(30) Foreign Application Priority Data

Jul. 8, 2003   (JP)   ............................. 2003-272015

(51) Int. Cl.
  H04N 9/73 (2006.01)
  H04N 5/228 (2006.01)
  H04N 5/217 (2006.01)
  H04N 3/14 (2006.01)
(52) U.S. Cl. ................. 348/226.1; 348/222.1; 348/241; 348/296
(58) Field of Classification Search ................. 348/296, 348/222.1, 226.1, 227.1, 228.1, 234, 294, 348/297, 298, 221.1, 223.1, 363, 364, 366
See application file for complete search history.

(56) References Cited

U.S. PATENT DOCUMENTS

| | | | | |
|---|---|---|---|---|
| 5,204,741 A | * | 4/1993 | Sakaguchi | ............... 348/208.6 |
| 5,960,153 A | | 9/1999 | Oster et al. | |
| 6,075,563 A | * | 6/2000 | Hung | ....................... 348/223.1 |
| 6,157,406 A | | 12/2000 | Iura et al. | |
| 6,710,818 B1 | * | 3/2004 | Kasahara et al. | ............. 348/607 |
| 7,212,234 B2 | * | 5/2007 | Sakaguchi et al. | ....... 348/223.1 |
| 2002/0154225 A1 | | 10/2002 | Matsumoto et al. | |
| 2003/0090566 A1 | | 5/2003 | Smith et al. | |
| 2004/0201729 A1 | * | 10/2004 | Poplin et al. | ............. 348/226.1 |
| 2005/0046704 A1 | * | 3/2005 | Kinoshita | ................ 348/226.1 |

* cited by examiner

*Primary Examiner*—David L Ometz
*Assistant Examiner*—Peter Chon
(74) *Attorney, Agent, or Firm*—Frommer Lawrence & Haug LLP; William S. Frommer; Thomas F. Presson

(57) ABSTRACT

An XY address scanning-type imaging apparatus, such as a CMOS imaging apparatus, having a high-speed shutter which is capable of reducing fluorescent-lamp flicker components and which enhances electronic camera-shake correction. When the vertical synchronization frequency is denoted as fv (Hz) and N is a positive integer, the shutter is set to N/120 seconds when 120/fv is an integer, and the shutter is set to N/100 seconds when 100/fv is an integer. In the NTSC system, when camera-shake correction is ON, the shutter speed is set to fraction (1/120) seconds, and when camera-shake correction is OFF, the shutter speed is set to fraction (1/60) seconds. In the PAL system, when camera-shake correction is ON, the shutter speed is set to fraction (1/100) seconds, and when camera-shake correction is OFF, the shutter speed is set to fraction (1/50) seconds.

14 Claims, 21 Drawing Sheets

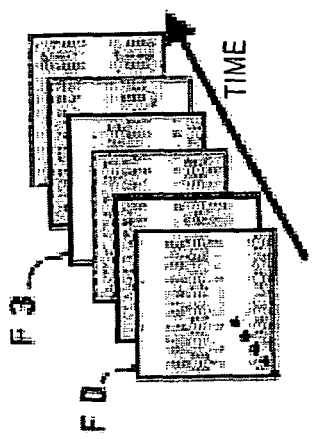
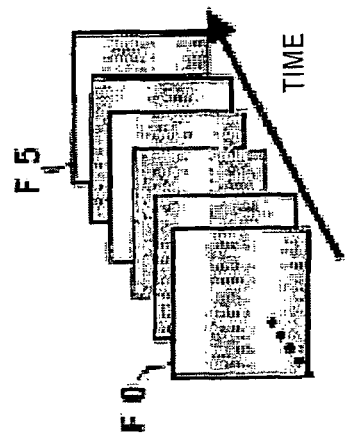
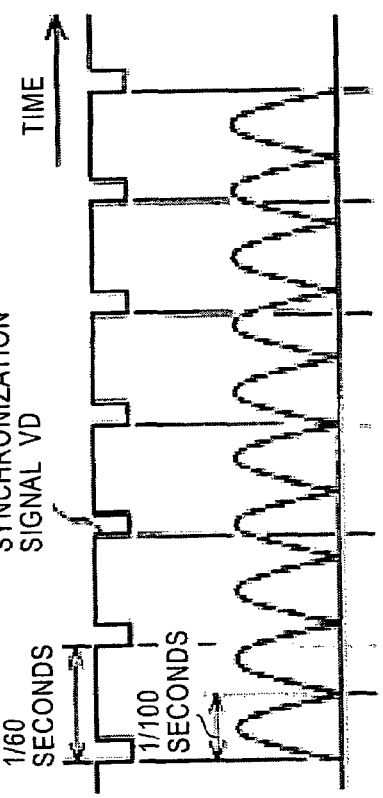
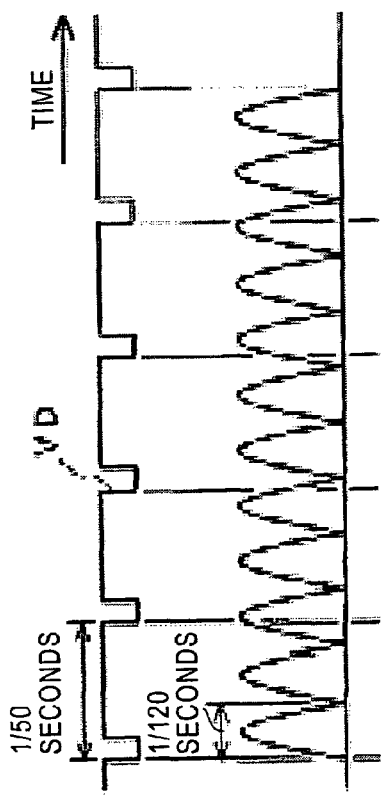
FIG. 5A
CASE 1
VERTICAL SYNCHRONIZATION FREQUENCY = 60 Hz (NTSC SYSTEM)
POWER-SUPPLY FREQUENCY = 50 Hz
FIG. 5B
CASE 2
VERTICAL SYNCHRONIZATION FREQUENCY = 50 Hz (PAL SYSTEM)
POWER-SUPPLY FREQUENCY = 60 Hz

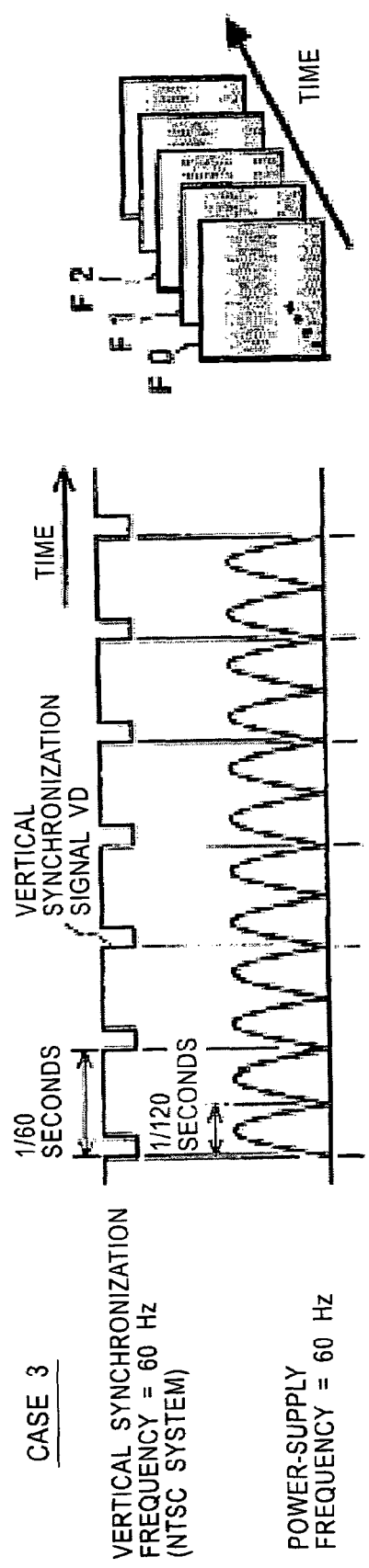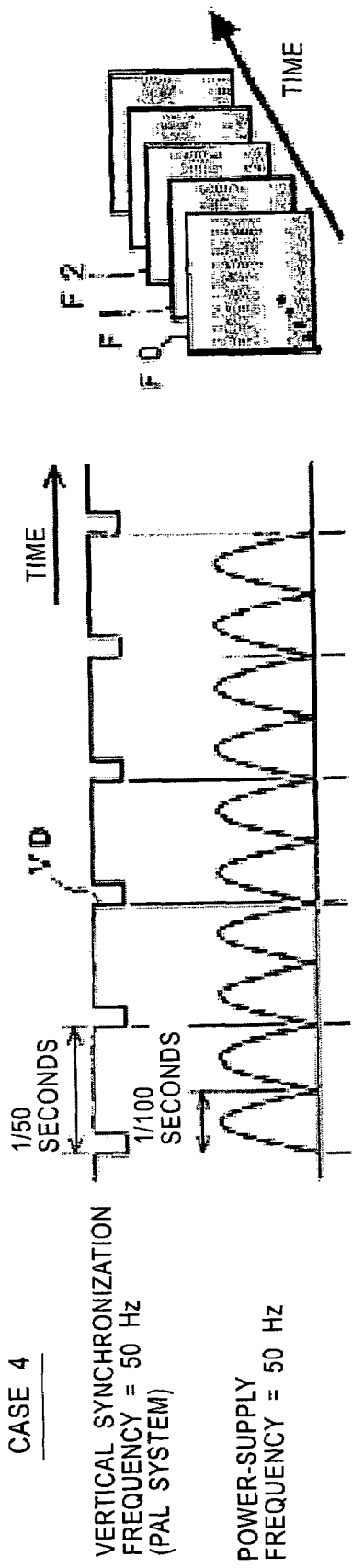
FIG. 6A CASE 3
VERTICAL SYNCHRONIZATION FREQUENCY = 60 Hz (NTSC SYSTEM)
POWER-SUPPLY FREQUENCY = 60 Hz
FIG. 6B CASE 4
VERTICAL SYNCHRONIZATION FREQUENCY = 50 Hz (PAL SYSTEM)
POWER-SUPPLY FREQUENCY = 50 Hz

FIG. 7

| VERTICAL SYNCHRONIZATION FREQUENCY | POWER-SUPPLY FREQUENCY | FLICKER | | CAPABILITY OF USE OF FLICKER REDUCTION METHOD USING CONTINUITY | SHUTTER SPEED AT WHICH FLICKER DOES NOT OCCUR |
|---|---|---|---|---|---|
| | | DURING NORMAL SHUTTER TIME | DURING HIGH-SPEED SHUTTER TIME | | |
| 60 Hz (NTSC SYSTEM: 60 FIELDS/ SECOND) | 50 Hz (CASE 1) | REPETITION PERIOD OF 3 FIELDS | REPETITION PERIOD OF 3 FIELDS | YES | 1/100 SECONDS |
| | 60 Hz (CASE 3) | FLICKER DOES NOT OCCUR | COMPLETES IN 1 FIELD | NO | 1/120 SECONDS, 1/60 SECONDS |
| 50 Hz (PAL SYSTEM: 50 FIELDS/ SECOND) | 50 Hz (CASE 4) | FLICKER DOES NOT OCCUR | COMPLETES IN 1 FIELD | NO | 1/100 SECONDS, 1/50 SECONDS |
| | 60 Hz (CASE 2) | REPETITION PERIOD OF 5 FIELDS | REPETITION PERIOD OF 5 FIELDS | YES | 1/120 SECONDS, 1/60 SECONDS |
| 30 Hz (PROGRESSIVE SYSTEM: 30 FRAMES/ SECOND) | 50 Hz (CASE 5) | REPETITION PERIOD OF 3 FIELDS | REPETITION PERIOD OF 3 FIELDS | YES | 1/100 SECONDS, 1/50 SECONDS, 3/100 SECONDS |
| | 60 Hz (CASE 6) | FLICKER DOES NOT OCCUR | COMPLETES IN 1 FIELD | NO | 1/120 SECONDS, 1/60 SECONDS, 1/40 SECONDS, 1/30 SECONDS |

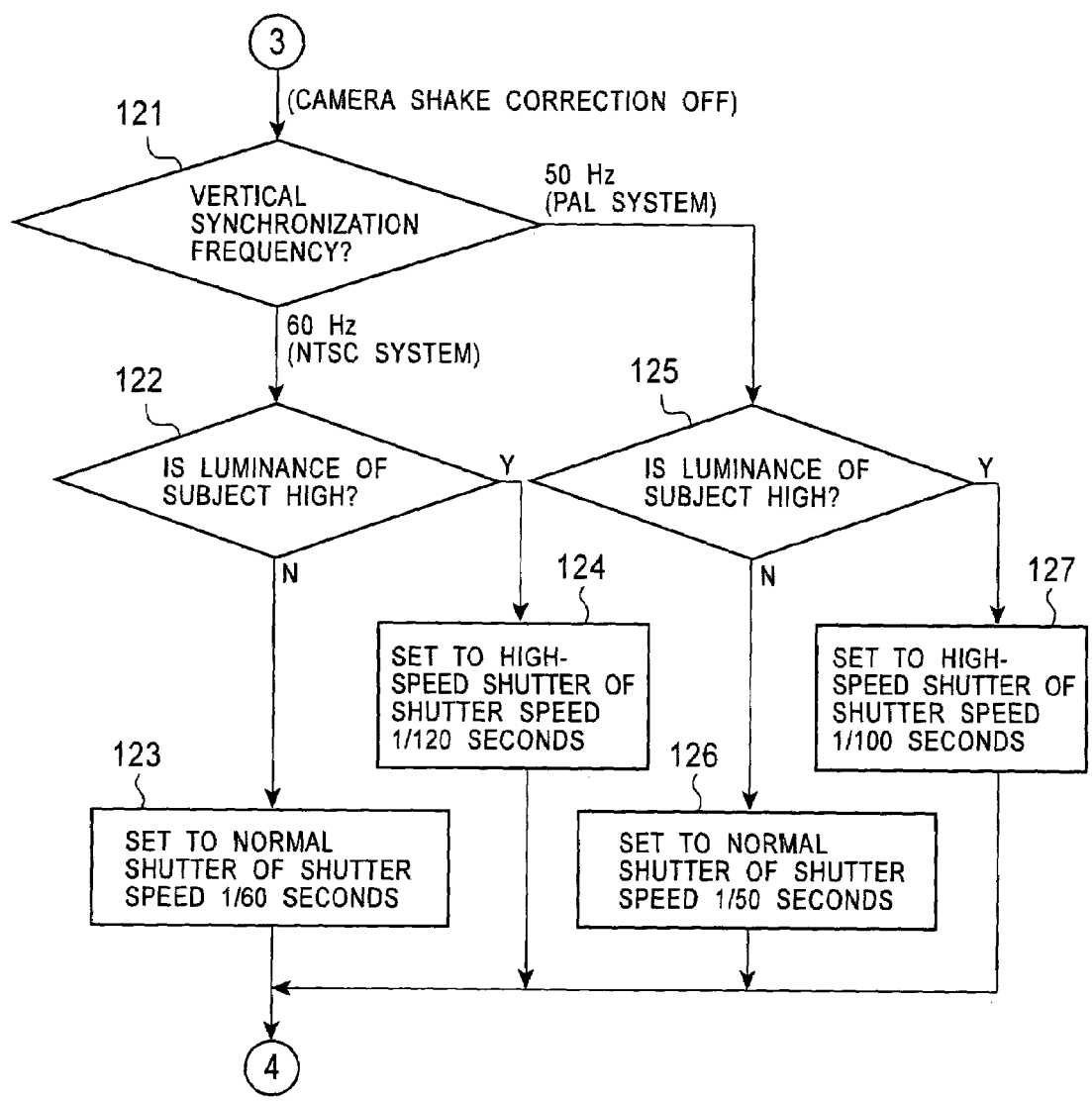

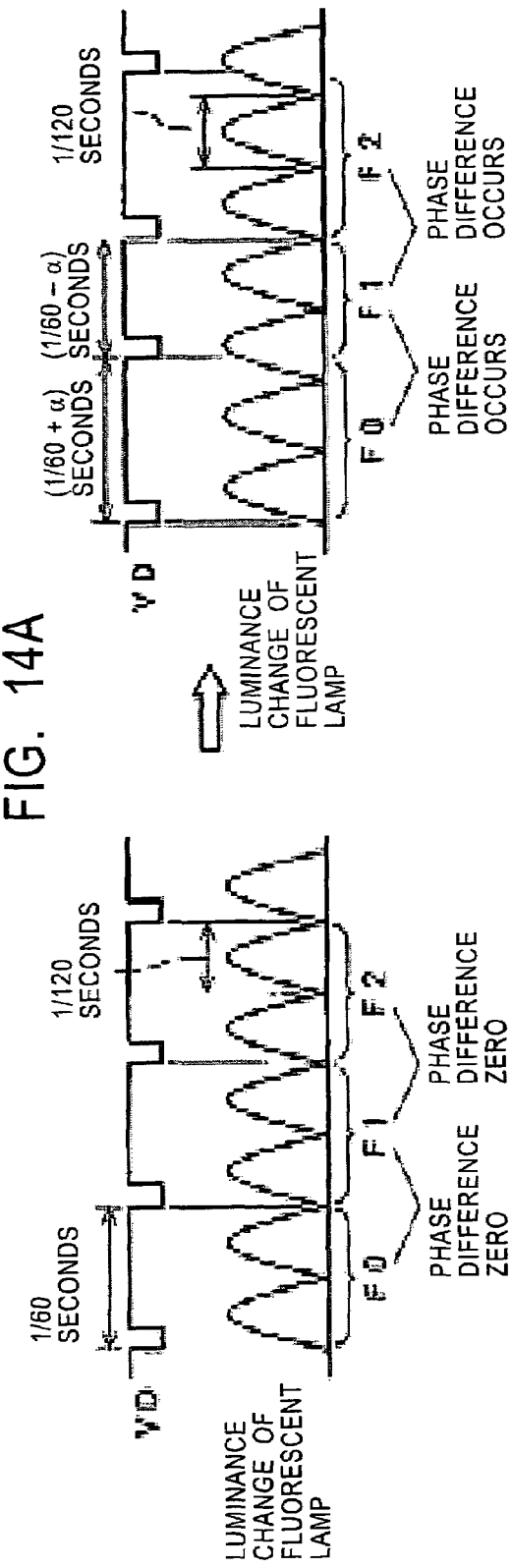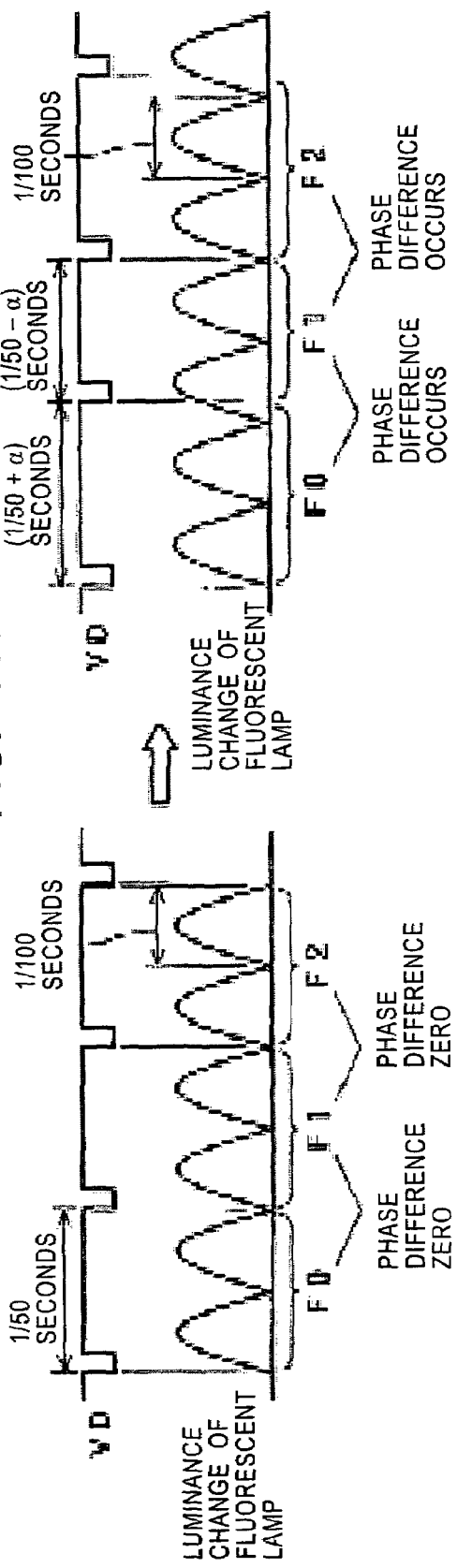

FIG. 16

| VERTICAL SYNCHRONIZATION FREQUENCY | POWER-SUPPLY FREQUENCY | SHUTTER SPEED (EXPOSURE TIME) | | FLICKER | NECESSITY/ AVAILABILITY OF FLICKER REDUCTION METHOD USING CONTINUITY |
|---|---|---|---|---|---|
| | | WHEN CAMERA SHAKE CORRECTION IS ON | WHEN CAMERA SHAKE CORRECTION IS OFF | | |
| 60 Hz (NTSC SYSTEM: 60 FIELDS/ SECOND) | 50 Hz | 1/120 SECONDS (1/60 SECONDS) | 1/60 SECONDS (1/120 SECONDS) | REPETITION PERIOD OF 3 FIELDS | YES |
| | 60 Hz | | | FLICKER DOES NOT OCCUR | NO |
| 50 Hz (PAL SYSTEM: 50 FIELDS/ SECOND) | 50 Hz | 1/100 SECONDS (1/50 SECONDS) | 1/50 SECONDS (1/100 SECONDS) | FLICKER DOES NOT OCCUR | NO |
| | 60 Hz | | | REPETITION PERIOD OF 5 FIELDS | YES |
| 30 Hz (PROGRESSIVE SYSTEM: 30 FRAMES/ SECOND) | 50 Hz | 1/120 SECONDS OR 1/60 SECONDS (1/40 SECONDS OR 1/30 SECONDS) | 1/30 SECONDS OR 1/40 SECONDS (1/60 SECONDS OR 1/120 SECONDS) | REPETITION PERIOD OF 3 FIELDS | YES |
| | 60 Hz | | | FLICKER DOES NOT OCCUR | NO |

FIG. 18

$$In'(x,y) = [1 + \Gamma n(y)] * In(x,y) \quad \cdots (1)$$

WHERE $$\Gamma n(y) = \sum_{m=1}^{\infty} \gamma m * \cos[m*(2\pi/\lambda o)*y + \Phi mn]$$

$$= \sum_{m=1}^{\infty} \gamma m * \cos(m * \omega o * y + \Phi mn) \quad \cdots (2)$$

$$\Delta \Phi mn = (-2\pi/3) * m \quad \cdots (3)$$

$$Fn(y) = \sum_{x} In'(x,y) = \sum_{x} \{[1 + \Gamma n(y)] * In(x,y)\}$$

$$= \sum_{x} In(x,y) + \Gamma n(y) \sum_{x} In(x,y)$$

$$= \alpha n(y) + \alpha n(y) * \Gamma n(y) \quad \cdots (4)$$

WHERE $$\alpha n(y) = \sum_{x} In(x,y) \quad \cdots (5)$$

FIG. 19

$$AVE[Fn(y)] = (1/3) \sum_{k=0}^{2} Fn\_k(y)$$

$$= (1/3) \left[ \sum_{k=0}^{2} \alpha n\_k(y) + \alpha n\_k(y) * \Gamma n\_k(y) \right]$$

$$= (1/3) \sum_{k=0}^{2} \alpha n\_k(y) + (1/3) \sum_{k=0}^{2} \alpha n\_k(y) * \Gamma n\_k(y)$$

$$= \alpha n(y) + (1/3) * \alpha n(y) \sum_{k=0}^{2} \Gamma n\_k(y)$$

$$= \alpha n(y) \qquad \cdots (6)$$

WHERE $$\alpha n(y) \cong \alpha n\_1(y) \cong \alpha n\_2(y) \qquad \cdots (7)$$

---

$$Fn(y) - Fn\_1(y)$$

$$= \{\alpha n(y) + \alpha n(y) * \Gamma n(y)\} - \{\alpha n\_1(y) + \alpha n\_1(y) * \Gamma n\_1(y)\}$$

$$= \alpha n(y) * \{\Gamma n(y) - \Gamma n\_1(y)\}$$

$$= \alpha n(y) \sum_{m=1}^{\infty} \gamma m * \{\cos(m * \omega o * y + \Phi mn)$$

$$- \cos(m * \omega o * y + \Phi mn\_1)\}$$

$$\cdots (8)$$

FIG. 20

$$gn(y) = \{Fn(y) - Fn\_1(y)\} / AVE[Fn(y)]$$

$$= \sum_{m=1}^{\infty} \gamma m * \{\cos(m * \omega o * y + \Phi mn)$$
$$- \cos(m * \omega o * y + \Phi mn\_1)\}$$

$$= \sum_{m=1}^{\infty} (-2) \gamma m \{\sin[m * \omega o * y + (\Phi mn + \Phi mn\_1)/2]$$
$$* \sin[(\Phi mn - \Phi mn\_1)/2]\}$$

$$\cdots (9)$$

$$gn(y) = \sum_{m=1}^{\infty} (-2) \gamma m * \sin(m * \omega o * y + \Phi mn + m * \pi/3)$$
$$* \sin(-m * \pi/3)$$

$$= \sum_{m=1}^{\infty} 2 * \gamma m * \cos(m * \omega o * y + \Phi mn + m * \pi/3 - \pi/2)$$
$$* \sin(m * \pi/3)$$

$$= \sum_{m=1}^{\infty} 2 * \gamma m * \sin(m * \pi/3)$$
$$* \cos(m * \omega o * y + \Phi mn + m * \pi/3 - \pi/2)$$

$$= \sum_{m=1}^{\infty} |Am| * \cos(m * \omega o * y + \theta m) \quad \cdots (10)$$

WHERE $$|Am| = 2 * \gamma m * \sin(m * \pi/3) \quad \cdots (11a)$$

$$\theta m = \Phi mn + m * \pi/3 - \pi/2 \quad \cdots (11b)$$

FIG. 21

$$\gamma m = |Am| / [2 * \sin(m * \pi / 3)] \quad \cdots (12a)$$
$$\Phi mn = \theta m - m * \pi / 3 + \pi / 2 \quad \cdots (12b)$$

$$DFT[gn(y)] = Gn(m) = \sum_{i=0}^{L-1} gn(i) * W^{m*i} \quad \cdots (13)$$

WHERE $$W = \exp[-j * 2\pi / L] \quad \cdots (14)$$

$$|Am| = 2 * |Gn(m)| / L \quad \cdots (15a)$$
$$\theta m = \tan^{-1}\{Im[Gn(m)] / Re[Gn(m)]\} \quad \cdots (15b)$$

WHERE $Im[Gn(m)]$ : IMAGINARY PART
$Re[Gn(m)]$ : REAL PART $$\gamma m = |Gn(m)| / [L * \sin(m * \pi / 3)] \quad \cdots (16a)$$
$$\Phi mn = \tan^{-1}\{Im[Gn(m)] / Re[Gn(m)]\} - m * \pi / 3 + \pi / 2$$
$$\quad \cdots (16b)$$

$$In(x,y) = In'(x,y) / [1 + \Gamma n(y)] \quad \cdots (17)$$

FIG. 22

$$g_n(y) = F_n(y) / AVE[F_n(y)]$$
$$= 1 + \sum_{m=1}^{\infty} \gamma_m * \cos(m * \omega_0 * y + \Phi_{mn}) \quad \cdots (18)$$

$$g_n(y) - 1 = \sum_{m=1}^{\infty} \gamma_m * \cos(m * \omega_0 * y + \Phi_{mn})$$
$$= \sum_{m=1}^{\infty} |A_m| * \cos(m * \omega_0 * y + \theta_m) \quad \cdots (19)$$

$$\gamma_m = 2 * |G_n(m)| / L \quad \cdots (20a)$$

$$\Phi_{mn} = \tan^{-1}\{Im[G_n(m)] / Re[G_n(m)]\} \quad \cdots (20b)$$

WHERE
$Im[G_n(m)]$ : IMAGINARY PART
$Re[G_n(m)]$ : REAL PART

IMAGING APPARATUS AND FLICKER REDUCTION METHOD

BACKGROUND OF THE INVENTION

1. Field of the Invention

The present invention relates to an imaging apparatus, such as a video camera or a digital still camera, in which an XY address scanning-type imaging device (imager, image sensor) such as a CMOS (Complementary Metal Oxide Semiconductor) imaging device is used, and to a method for reducing fluorescent lamp flicker which occurs in a video signal obtained from the imaging device when a subject is photographed by the imaging apparatus under the illumination of a fluorescent lamp.

2. Description of the Related Art

When a subject is photographed by a video camera under the illumination of a fluorescent lamp which is powered on by a commercial AC power-supply, an intensity change with respect to time, that is, so-called fluorescent lamp flicker, occurs in the video signal of the photographed output due to the difference between the frequency (twice the commercial AC power-supply frequency) of the luminance change (change in the amount of light) of the fluorescent lamp and the vertical synchronization frequency (imaging frequency) of the camera.

A description will now be given of a case in which, for example, in an area where the commercial AC power-supply frequency is 50 Hz, a subject is photographed by an NTSC CCD camera (the vertical synchronization frequency (the field frequency in this case) is 60 Hz) under the illumination of a fluorescent lamp of a non-inverter system (although it is not restricted to the case of a non-inverter-system fluorescent lamp because flicker occurs also in the case of an inverter-system fluorescent lamp when rectification is not sufficient). In this case, as shown in FIG. 1, whereas the period of one field is $1/60$ seconds, the period of the luminance change of the fluorescent lamp is $1/100$ seconds. As a result, the exposure timing of each field is shifted with respect to the luminance change of the fluorescent lamp, and the amount of exposure in each pixel changes.

For this reason, for example, when the exposure time is $1/60$ seconds, in periods a1, a2, and a3, the amount of exposure differs even with the same exposure time. Furthermore, when the exposure time is shorter than $1/60$ seconds (when it is not $1/100$ seconds, as will be described later), in periods b1, b2, and b3, the amount of exposure differs even with the same exposure time.

The exposure timing with respect to the luminance change of the fluorescent lamp returns to the original timing every three fields, and therefore, the intensity change due to flicker repeats every three fields. That is, the luminance ratio of each field changes depending on the exposure period, but the flicker period does not change.

However, in a progressive-system-type camera, such as a digital still camera, when the vertical synchronization frequency (the frame frequency in this case) is 30 Hz, the intensity change is repeated every three frames.

Furthermore, for the fluorescent lamp, usually, a plurality of fluorescent substances, for example, red, green, and blue fluorescent substances, are used to emit white light. However, each of these fluorescent substances has specific persistence characteristics and emits light in a decaying manner with individual persistence characteristics in the period from the stopping of discharge, which exists in the period of the luminance change, up to the start of the next discharge. For this reason, in this period, since the light, which is initially white light, gradually decays while changing its hue, if the exposure timing is shifted in the manner described above, not only does the intensity change but a hue change also occurs. Furthermore, since the fluorescent lamp has specific spectral characteristics such that a strong peak exists at a specific wavelength, variation components of the signal differs depending on the color.

Then, so-called color flicker occurs due to such a hue change and the difference in the variation components for each color.

In comparison, when the power-supply frequency is 50 Hz and the vertical synchronization frequency of the imaging apparatus is 60 Hz, as shown in FIG. 1, if the exposure time is set to $1/100$ seconds, which is the period of the luminance change of the fluorescent lamp, as shown in the bottommost portion of FIG. 1, the amount of exposure becomes constant regardless of the exposure timing, and flicker does not occur.

Furthermore, a method for reducing fluorescent lamp flicker without specifying the shutter speed in this manner has been considered. In the case of an imaging apparatus, like a CCD imaging apparatus, in which all the pixels within one picture plane are exposed at the same exposure timing, since an intensity change and a color change due to flicker occur only between fields, a reduction in flicker can be realized comparatively easily.

For example, in the case of FIG. 1, if the exposure time is not $1/100$ seconds, flicker occurs at the repetition period of three fields. Therefore, flicker can be suppressed to a level at which there is no problem in practical terms by predicting the current luminance and color changes from the video signal three fields before so that the average value of the video signals of each field becomes constant and by adjusting the gain of the video signal of each field according to the predicted result.

However, in an XY address scanning-type imaging device, such as a CMOS imaging device, the exposure timing for each pixel is shifted in sequence by an amount corresponding to one period of the reading clock (pixel clock) in the horizontal direction of the picture plane, and the exposure timing differs in all the pixels. As a result, in the above-described method, flicker cannot be suppressed sufficiently.

FIG. 2 shows this situation. As described above, also in the horizontal direction of the picture plane, the exposure timing of each pixel is shifted in sequence, but one horizontal period is sufficiently short when compared to the period of the luminance change of the fluorescent lamp. Thus, assuming that the exposure timings of the pixels in the same line are the same time, the exposure timing of each line in the vertical direction of the picture plane is shown. In practical terms, the above assumption does not cause problems to occur.

As shown in FIG. 2, in an XY address scanning-type imaging apparatus, for example, a CMOS imaging apparatus, the exposure timing differs for each line (F0 indicates the situation for a particular field), and the amount of exposure differs in each line. As a result, an intensity change and a color change due to flicker occur not only between fields but also inside fields, and the changes appear as a stripe pattern (the direction of the stripes themselves is the horizontal direction, and the direction of the change of the stripe is the vertical direction) on the picture plane.

FIG. 3 shows the state of this in-plane (intra-picture plane) flicker when the subject is a uniform pattern. Since one period (one wavelength) of the stripe pattern is $1/100$ seconds, stripe patterns for 1.666 periods occur in one picture plane. When the number of reading lines per field is denoted as M, one period of the stripe pattern corresponds to $L = M*60/100$ at the number of reading lines. In the specification and the drawings, an asterisk (*) is used as a symbol for multiplication.

As shown in FIG. 4, this stripe pattern corresponds to five periods (five wavelengths) in three fields (three frames), and when viewed continuously, it appears to flow in the vertical direction.

FIGS. 3 and 4 show only the intensity change due to flicker. However, in practice, the above-described color change is added, and the image quality is deteriorated considerably. In particular, color flicker becomes more noticeable as the shutter speed becomes higher (the exposure time becomes shorter), and in the XY address scanning-type imaging apparatus, the influence of the color flicker appears within the picture plane. Consequently, the deterioration of the image quality becomes more pronounced.

Also, in the case of such an XY address scanning-type imaging apparatus, when the power-supply frequency is 50 Hz and the vertical synchronization frequency of the imaging apparatus is 60 Hz, as shown in FIG. 2, if the exposure time is set to $1/100$ seconds, which is the period of the luminance change of the fluorescent lamp, the amount of exposure becomes constant regardless of the exposure timing, and fluorescent lamp flicker, including in-plane flicker, does not occur.

Furthermore, a method for reducing fluorescent lamp flicker that is specific to the XY address scanning-type imaging apparatus, such as a CMOS imaging apparatus, without specifying the shutter speed in this manner, has been proposed.

More specifically, in Japanese Unexamined Patent Application Publication No. 2000-350102 or 2000-23040, a method is disclosed in which flicker components are estimated by measuring the amount of light from the fluorescent lamp by using a photoreceiving device and a photometering device, and the gain of a video signal from the imaging device is controlled in accordance with the estimated result.

However, when a subject is photographed under the illumination of a fluorescent lamp by means of an XY address scanning-type imaging apparatus such as a CMOS imaging apparatus, the form of flicker which occurs in the video signal from the imaging apparatus is greatly changed according to the combination of the video system of the imaging apparatus (specifically, the vertical synchronization frequency), the frequency of the commercial AC power-supply for driving the fluorescent lamp, and the shutter speed (exposure time) of the electronic shutter.

More specifically, as the video system of the imaging apparatus, the NTSC system (the vertical synchronization frequency is 60 Hz) and the PAL system (the vertical synchronization frequency is 50 Hz), which correspond to a broadcasting system, are known. Most recent video cameras are compatible with both the NTSC system and the PAL system. It is common practice that, when video cameras are shipped from the factory, they are electrically set to either the NTSC system or the PAL system according to the shipment destination.

The commercial AC power-supply frequency is 50 Hz in some areas of Japan and in some countries or areas of the world, and it is 60 Hz in other areas of Japan and in other countries or areas of the world.

Case 1 of FIG. 5A shows a case in which a subject is photographed by a CMOS imaging apparatus of the NTSC system under the illumination of a fluorescent lamp in an area where the power-supply frequency is 50 Hz.

In this case, whereas one field is $1/60$ seconds, the period of the luminance change of the fluorescent lamp is $1/100$ seconds. Consequently, as shown in FIGS. 2 to 4, during the normal shutter time, where the exposure time is $1/60$ seconds, and also during the high-speed shutter time, where the exposure time is shorter than $1/60$ seconds, flicker having continuity in the time axis, that is, flicker whose repetition period is three fields (three frames), occurs (when viewed continuously, it appears to flow in the vertical direction).

However, as shown in case 1 in FIG. 7, when the shutter is set to a high-speed shutter with an exposure time of $1/100$ seconds, the amount of exposure becomes constant regardless of the exposure timing, and flicker, including in-plane flicker, does not occur.

Case 2 of FIG. 5B shows a case in which a subject is photographed by a CMOS imaging apparatus of the PAL system under the illumination of a fluorescent lamp in an area where the power-supply frequency is 60 Hz.

In this case, whereas one field is $1/50$ seconds, the period of the luminance change of the fluorescent lamp is $1/120$ seconds. Consequently, during the normal shutter time, where the exposure time is $1/50$ seconds, and also during the high-speed shutter time, where the exposure time is shorter than $1/50$ seconds, flicker having continuity in the time axis, that is, flicker whose repetition period is five fields (five frames), occurs (when viewed continuously, it appears to flow in the vertical direction).

However, as shown in case 2 in FIG. 7, when the shutter is set to a high-speed shutter with an exposure time of $1/120$ seconds or $1/60$ seconds, the amount of exposure becomes constant regardless of the exposure timing, and flicker, including in-plane flicker, does not occur.

As in case 1 or case 2 of FIG. 7, when flicker having continuity in the time axis, that is, flicker whose repetition period is a plurality of vertical periods (a plurality of picture planes), occurs, flicker components can be reduced by the above-described conventional method or the method of the invention-of the earlier application (Japanese Patent Application No. 2003-173642) by the same inventors as those of the present application (to be described later), in which flicker components are estimated using the continuity of flicker, and the video signal from the imaging device is corrected in accordance with the estimated result, thereby reducing the flicker components.

In comparison, case 3 of FIG. 6A shows a case in which a subject is photographed by a CMOS imaging apparatus of the NTSC system under the illumination of a fluorescent lamp in an area where the power-supply frequency is 60 Hz.

In this case, whereas one field is $1/60$ seconds, the period of the luminance change of the fluorescent lamp is $1/120$ seconds. Consequently, during the normal shutter time, where the exposure time is $1/60$ seconds, the amount of exposure becomes constant regardless of the exposure timing, and flicker, including in-plane flicker, does not occur. However, during a high-speed shutter time, where the exposure time is shorter than $1/60$ seconds, as shown on the right side of FIG. 6A, flicker that completes in one field (one picture plane) and whose stripe pattern becomes the same in each field (each picture plane) occurs.

However, as shown in case 3 in FIG. 7, when the shutter is set to a high-speed shutter with an exposure time of $1/120$ seconds, similarly to that during the normal shutter time with an exposure time of $1/60$ seconds, the amount of exposure becomes constant regardless of the exposure timing, and flicker, including in-plane flicker, does not occur.

Case 4 of FIG. 6B shows a case in which a subject is photographed by a CMOS imaging apparatus of the PAL system under the illumination of a fluorescent lamp in an area where the power-supply frequency is 50 Hz.

In this case, whereas one field is $1/50$ seconds, the period of the luminance change of the fluorescent lamp is $1/100$ seconds. Consequently, during the normal shutter time, where the exposure time is $1/50$ seconds, the amount of exposure becomes constant regardless of the exposure timing, and flicker, including in-plane flicker, does not occur. However, during a high-speed shutter time, where the exposure time is shorter than $1/50$ seconds, as shown on the right side of FIG. 6B, flicker that completes in one field (one picture plane) and whose stripe pattern becomes the same in each field (each picture plane) occurs.

However, as shown in case 4 in FIG. 7, when the shutter is set to a high-speed shutter with an exposure time of $1/100$ seconds, similarly to that during the normal shutter time with an exposure time of $1/50$ seconds, the amount of exposure becomes constant regardless of the exposure timing, and flicker, including in-plane flicker, does not occur.

Then, when flicker, which is not continuous in the time axis, that completes in one field (one picture plane), occurs in case 3 or case 4 of FIG. 7, in which the shutter is set to a high-speed shutter, since a distinction between picture pattern components by the subject and fluorescent-lamp flicker components in the video signal from the imaging device cannot be made from the very beginning, it is not possible to reduce flicker components by the flicker reduction method using the above-described continuity of flicker.

FIG. 7 summarizes the foregoing. In FIG. 7, case 1, in which the vertical synchronization frequency is 60 Hz and the power-supply frequency is 50 Hz; case 2, in which the vertical synchronization frequency is 50 Hz and the power-supply frequency is 60 Hz; case 3, in which the vertical synchronization frequency is 60 Hz and the power-supply frequency is 60 Hz; and case 4, in which the vertical synchronization frequency is 50 Hz and the power-supply frequency is 50 Hz, are as described above.

FIG. 7 also shows a case in which the vertical synchronization frequency (the frame frequency in this case) is 30 Hz in the CMOS imaging apparatus of the progressive system.

As shown in case 5 in FIG. 7, when a subject is photographed under the illumination of a fluorescent lamp in an area in which the power-supply frequency is 50 Hz by using a CMOS imaging apparatus in which the vertical synchronization frequency is 30 Hz, whereas one vertical period is $1/30$ seconds, the period of the luminance change of the fluorescent lamp is $1/100$ seconds. Consequently, during the normal shutter time, where the exposure time is $1/30$ seconds, and also during the high-speed shutter time, where the exposure time is shorter than $1/30$ seconds, flicker having continuity in the time axis, that is, flicker whose repetition period is three vertical periods (three picture planes), occurs (when viewed continuously, it appears to flow in the vertical direction).

However, when the shutter is set to a high-speed shutter with an exposure time of $1/100$ seconds, $1/50$ seconds, or $3/100$ seconds, which is an integral multiple of the period of the luminance change of the fluorescent lamp, the amount of exposure becomes constant regardless of the exposure timing, and flicker, including in-plane flicker, does not occur.

Furthermore, as shown in case 6 in FIG. 7, when a subject is photographed under the illumination of a fluorescent lamp in an area where the power-supply frequency is 60 Hz by using a CMOS imaging apparatus in which the vertical synchronization frequency is 30 Hz, whereas one vertical period is $1/30$ seconds, the period of the luminance change of the fluorescent lamp is $1/120$ seconds. Consequently, during the normal shutter time, where the exposure time is $1/30$ seconds, the amount of exposure becomes constant regardless of the exposure timing, and flicker, including in-plane flicker, does not occur. However, during the high-speed shutter time, where the exposure time is shorter than $1/30$ seconds, similarly to that during the high-speed shutter of case 3 and case 4, flicker that completes in one period (one frame in this case) and whose flicker stripe pattern becomes the same in each vertical period (each frame in this case) occurs.

However, when the shutter is set to a high-speed shutter with an exposure time of $1/120$ seconds, $1/60$ seconds, or $1/40$ seconds, which is an integral multiple of the period of the luminance change of the fluorescent lamp, similarly to that during the normal shutter time with an exposure time of $1/30$ seconds, the amount of exposure becomes constant regardless of the exposure timing, and flicker, including in-plane flicker, does not occur.

As described above, in case 3, case 4, or case 6, in which the shutter is set to a high-speed shutter, flicker that completes in one period (one picture plane) and whose stripe pattern becomes the same in each vertical period (each picture plane) occurs, excluding a case in which the shutter speed is set at a specific speed, and a distinction between picture pattern components and fluorescent lamp flicker components in the video signal from the imaging device cannot be made. As a result, it is not possible to reduce flicker components by the flicker reduction method using the above-described continuity of flicker.

For this reason, in these cases, the shutter speed (exposure time) of the high-speed shutter may be set to a speed at which flicker does not occur, that is, $1/120$ seconds in case 4; $1/100$ seconds in case 3; and $1/120$ seconds, $1/60$ seconds, or $1/40$ seconds in case 6. Alternatively, rather than being set to a high-speed shutter, the shutter may be set to a normal shutter in which flicker does not occur. That is, in case 3, the shutter speed may be set to $1/60$ seconds; in case 4, the shutter speed may be set to $1/50$ seconds; and in case 6, the shutter speed may be set to $1/30$ seconds.

However, in order to achieve the above, it is necessary to detect the power-supply frequency separately by some method.

For example, a method for detecting the power-supply frequency on the basis of the relationship between the period (wavelength) of a stripe pattern of the flicker and the vertical period (the reciprocal of the vertical synchronization frequency) of the imaging apparatus has been considered. However, when flicker that is not continuous in the time axis and that completes in one vertical period (one picture plane) occurs in the manner described above, since a distinction between picture pattern components and fluorescent lamp flicker components in the video signal from the imaging device cannot be made from the very beginning, it is not possible to detect the power-supply frequency.

Furthermore, there is a method for detecting the power-supply frequency by an external sensor. However, in this method, the size and the cost of the imaging apparatus system increase.

Furthermore, when the shutter is set to a normal shutter rather than being set to a high-speed shutter, there are problems in electronic camera-shake correction, as described below.

Most recent imaging apparatuses have a camera-shake correction function of an electronic image frame cutout type. In this camera-shake correction method, camera shake is detected by a camera shake sensor incorporated in the camera or by a motion vector which occurs in the image, and an area of an appropriate size at an appropriate position is cut out and output from the input image on the basis of the detected amount of camera shake, thereby correcting the image signal so that the output image is always seen as being stationary.

However, in such electronic camera-shake correction, camera shake between picture planes (between fields or between frames) can be corrected, but commonly called afterimage blur due to camera shake which occurs during an exposure period cannot be corrected from the viewpoint of principles. That is, although camera shake between picture planes can be reduced by camera-shake correction, since the afterimage blur remains as is, the image quality deteriorates by the unbalance thereof.

Then, in order to reduce this afterimage blur, it is recommended that the shutter be set to a high-speed shutter so as to decrease the exposure time. However, if the shutter speed is made too high, rough movement of the moving picture becomes conspicuous, and therefore, the shutter is set to a shutter speed with approximately 1/100 seconds at which the relationship of the above becomes just satisfactory.

As described above, the imaging apparatus having an electronic camera-shake correction function is set so that a high-speed shutter is realized automatically when camera-shake correction is ON. That is, in order to perform electronic camera-shake correction, a high-speed shutter is necessary, and-in order to solve the problem of the fluorescent-lamp flicker, the high-speed shutter cannot be omitted.

SUMMARY OF THE INVENTION

Accordingly, the present invention aims to reduce fluorescent-lamp flicker components regardless of the combination of the power-supply frequency and the vertical synchronization frequency of the imaging apparatus without detecting the frequency of the power supply for driving the fluorescent lamp and also aims to realize a high-speed shutter required for electronic camera-shake correction.

In one aspect, the present invention provides an imaging apparatus including an XY address scanning-type imaging device and a controller for controlling the electronic shutter speed, wherein, when the set vertical synchronization frequency of the imaging apparatus is denoted as fv (Hz) and N is a positive integer, in a case where 120/fv is an integer, the controller sets the electronic shutter speed to an electronic shutter speed at which the exposure time becomes N/120 seconds, and in a case where 100/fv is an integer, the controller sets the electronic shutter speed to an electronic shutter speed at which the exposure time becomes N/100 seconds.

In another aspect, the present invention provides a method for reducing fluorescent-lamp flicker components contained in a video signal obtained by photographing a subject by an XY address scanning-type imaging device under the illumination of a fluorescent lamp, the method including, when the set vertical synchronization frequency of the imaging apparatus including the imaging device is denoted as fv (Hz) and N is a positive integer: a shutter control step of setting a shutter speed to an electronic shutter speed at which the exposure time becomes N/120 seconds in a case where 120/fv is an integer, and of setting the shutter speed to an electronic shutter speed at which the exposure time becomes N/100 seconds in a case where 100/fv is an integer; and a flicker reduction process step of reducing flicker components by estimating flicker components from the video signal and by correcting the video signal in accordance with the estimated result in a state in which the electronic shutter speed is set in the shutter control step.

In each case shown in FIG. 7, if the vertical synchronization frequency is denoted as fv and the power-supply frequency is denoted as fp, unless the vertical period 1/fv (seconds) is an integral multiple of the period ½ fp (seconds) of the luminance change of the fluorescent lamp as in case 1 (fv=60 Hz, fp=50 Hz), case 2 (fv=50 Hz, fp=60 Hz), or case 5 (fv=30 Hz, fp=50 Hz), that is, unless 2 fp is an integral multiple of fv, flicker having continuity in the time axis, that is, flicker whose repetition period is a plurality of vertical periods (a plurality of picture planes), occurs (when viewed continuously, it appears to flow in the vertical direction) regardless of the shutter speed, and flicker components can be reduced by the flicker reduction method using the continuity of flicker.

However, when the vertical period 1/fv (seconds) is an integral multiple of the period ½ fp (seconds) of the luminance change of the fluorescent lamp, as in case 3 (fv=60 Hz, fp=60 Hz), case 4 (fv=50 Hz, fp=50 Hz), or case 6 (fv=30 Hz, fp=60 Hz), that is, when 2 fp is an integral multiple of fv, flicker does not occur to begin with. However, during the high-speed shutter time, flicker that completes in one vertical period (one picture plane) and whose stripe pattern becomes the same in each vertical period (each picture plane) occurs, and flicker components cannot be reduced by the flicker reduction method in which the continuity of the flicker is used.

In comparison, in the imaging apparatus of the above-described configuration of the present invention, when 120/fv becomes an integer, as in the above-described case 1, case 3, case 5, or case 6, the shutter is set to a shutter speed of N/120 (seconds) in the range at which the exposure time does not exceed the vertical period 1/fv (seconds), and when 100/fv becomes an integer, as in the above-described case 2 or case 4, the shutter is set to a shutter speed of N/100 (seconds) in the range where the exposure time does not exceed the vertical period 1/fv (seconds).

That is, when fv=60 Hz, as in case 1 or case 3, the shutter speed is set to 1/120 seconds or 1/60 seconds; when fv=50 Hz, as in case 2 or case 4, the shutter speed is set to 1/100 seconds or 1/50 seconds; and when fv=30 Hz, as in case 5 or case 6, the shutter speed is set to 1/120 seconds, 1/60 seconds, 1/40 seconds, or 1/30 seconds.

Therefore, in case 1, case 2, or case 5, flicker having continuity in the time axis, that is, flicker whose repetition period is three fields, five fields, or three frames, occurs. Thus, flicker components can be reduced by the flicker reduction method using the continuity of flicker; moreover, in case 3, case 4, or case 6, flicker does not occur to begin with, and the flicker reduction process is not necessary.

Moreover, for this reason, it is not necessary to detect the power-supply frequency fp, and the shutter control means of the imaging apparatus need only make a determination as to the set vertical synchronization frequency fv (video system) of the imaging apparatus. Furthermore, when electronic camera-shake correction is to be performed, a high-speed shutter with an exposure time shorter than the vertical period 1/fv (seconds) can be realized by setting, for example, N=1, and an improvement in image quality can be achieved by the high-speed shutter.

BRIEF DESCRIPTION OF THE DRAWINGS

FIGS. 5A and 5B illustrate cases in which flicker having continuity in the time axis occurs;

FIGS. 6A and 6B illustrate cases in which flicker that completes in one picture plane during a high-speed shutter time occurs;

FIG. 7 shows flicker occurrence forms for each case of the combination of the vertical synchronization frequency and the power-supply frequency;

FIG. 12 shows another part of the example of the shutter control process performed by the shutter control section;

FIG. 14A illustrates an example of a method for detecting whether or not a subject is illuminated by a fluorescent lamp in a case where the vertical synchronization frequency is 60 Hz (NTSC system) and the power-supply frequency is 60 Hz; and FIG. 14B illustrates an example of a method for detecting whether or not a subject is illuminated by a fluorescent lamp in a case where the vertical synchronization frequency is 50 Hz (PAL system) and the power-supply frequency is 50 Hz;

FIG. 16 shows shutter speed settings in the method of the present invention;

FIG. 18 shows equations used to illustrate the flicker reduction method of a specific example;

FIG. 19 shows equations used to illustrate the flicker reduction method of the specific example;

FIG. 20 shows equations used to illustrate the flicker reduction method of the specific example;

FIG. 21 shows equations used to illustrate the flicker reduction method of the specific example; and FIG. 22 shows equations used to illustrate the flicker reduction method of the specific example.

DETAILED DESCRIPTION OF THE PREFERRED EMBODIMENTS

Figure 8:
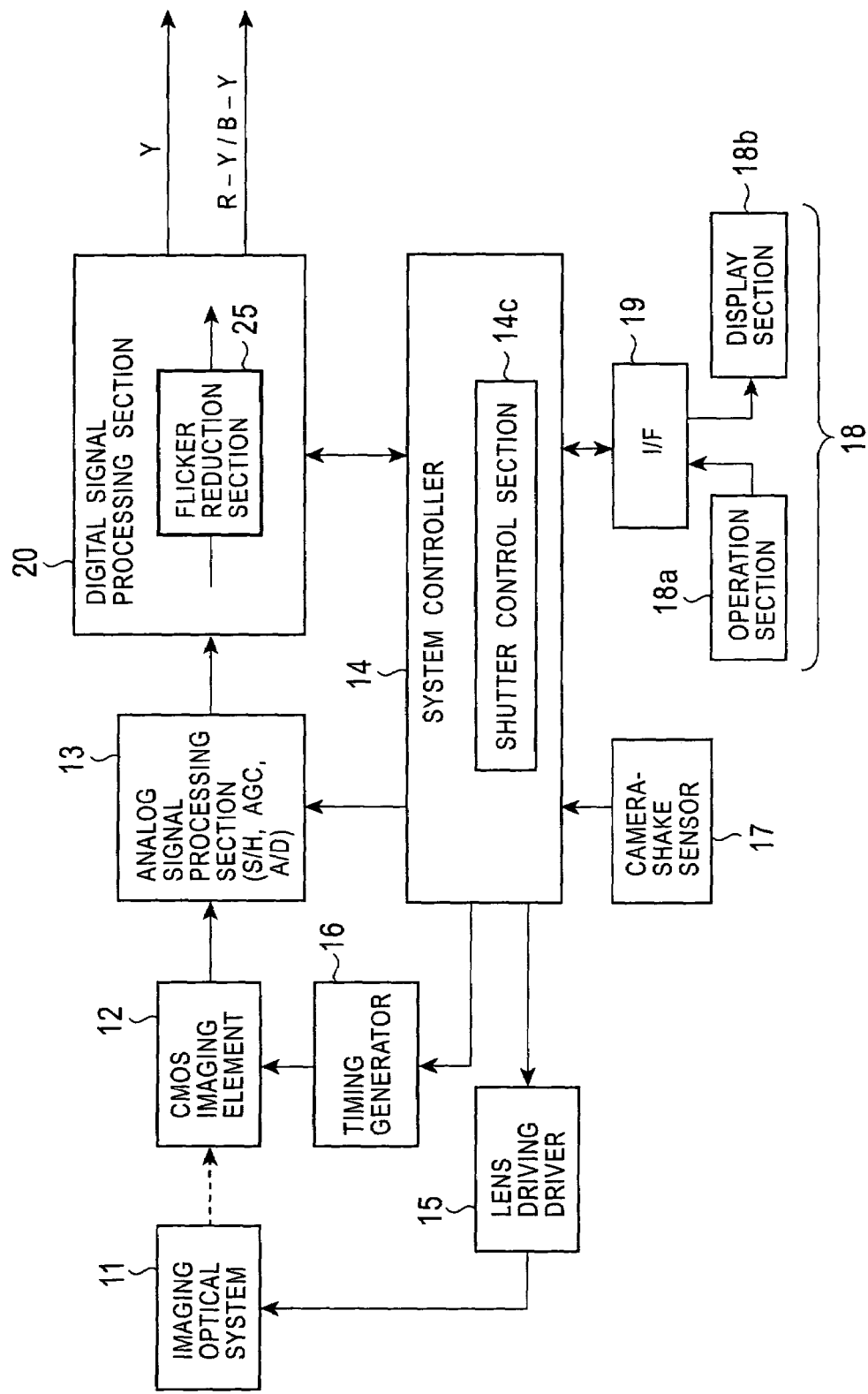
FIG. 8 shows the system configuration of an embodiment of an imaging apparatus of the present invention.
Figure 9:
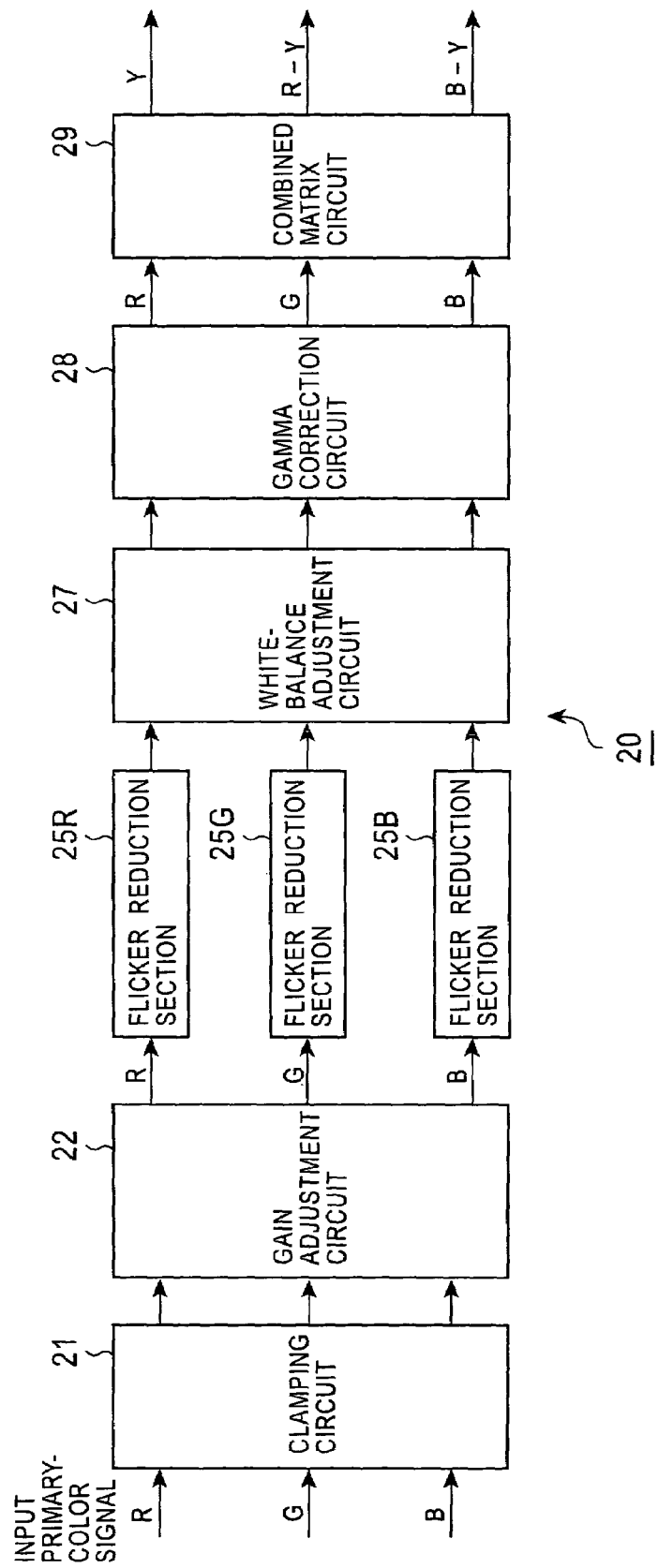
FIG. 9 shows an example of a digital signal processing section of a primary-color system.

[Embodiment of Imaging Apparatus: FIGS. 8 and 9]

(System Configuration: FIG. 8)

FIG. 8 shows the system configuration of an embodiment of an imaging apparatus of the present invention, and also shows a video camera, which is selectively set to either the NTSC system (fv=60 Hz) or the PAL system (fv=50 Hz) and in which a CMOS imaging device is used as an XY address scanning-type imaging device.

In the imaging apparatus of this embodiment, that is, the video camera, light from a subject enters a CMOS imaging device 12 via an imaging optical system 11. The light is photoelectrically converted at the CMOS imaging device 12, and an analog video signal is obtained from the CMOS imaging device 12.

The CMOS imaging device 12 is formed in such a manner that a plurality of pixels having a photodiode (photogate), a transfer gate (shutter transistor)., a switching transistor (address transistor), an amplifier transistor, a resetting transistor (reset gate), etc., are arranged two-dimensionally on a CMOS substrate, and also, a vertical scanning circuit, a horizontal scanning circuit, and a video signal output circuit are formed.

The CMOS imaging device 12 may be of either a primary-color system or a complementary-color system, as will be described later, and the analog video signal obtained from the CMOS imaging device 12 is a primary-color signal of each RGB color, or a color signal of the complementary-color system.

The analog video signal from the CMOS imaging device 12 is sampled and held for each color signal at an analog signal processing section 13 formed as an IC (Integrated Circuit), gain is controlled by AGC (Automatic Gain Control), and the analog video signal is converted into a digital signal by A/D conversion.

The digital video signal from the analog signal processing section 13 is processed, as will be described later, at a digital signal processing section 20 formed as an IC. After flicker components are reduced for each signal component, as will be described later, at a flicker reduction section 25 inside the digital signal processing section 20, the signal is finally converted into a luminance signal Y and red and blue color-difference signals R-Y and B-Y, and these signals are output from the digital signal processing section 20.

A system controller 14 is formed of a microcomputer, etc., and controls each section of the camera.

More specifically, a lens driving control signal is supplied from the system controller 14 to a lens driving driver 15 formed by an IC, and the lens and the iris of the imaging optical system 11 are driven by the lens driving driver 15.

Furthermore, a timing control signal is supplied from the system controller 14 to a timing generator 16. Various kinds of timing signals are supplied from the timing generator 16 to the CMOS imaging device 12, whereby the CMOS imaging device 12 is driven.

At this time, the shutter speed of the CMOS imaging device 12 is also controlled in accordance with the timing control signal from the system controller 14. Specifically, the shutter speed is set by a shutter control section 14c inside the system controller 14, as will be described later.

Furthermore, the detected signal of each signal component is received by the system controller 14 from the digital signal processing section 20. In accordance with the AGC signal from the system controller 14, the gain of each color signal is controlled, as described above, at the analog signal processing section 13, and also, the system controller 14 controls signal processing in the digital signal processing section 20.

Furthermore, a camera-shake sensor 17 is connected to the system controller 14, so that camera-shake information obtained therefrom is used for camera-shake correction.

An operation section 18a and a display section 18b, which constitute a user interface 18, is connected via an interface 19 formed by a microcomputer, etc., to the system controller 14. Thus, the setting operation and the selection operation at the operation section 18a are detected by the system controller 14, and also, the set status and the control status of the camera are displayed on the display section 18b by the system controller 14.

The set status of one of the NTSC system and the PAL system described above is held as a setting flag inside the system controller 14, so that it is used for shutter control (to be described later) by the shutter control section 14c.

(Example of the Configuration of Digital Signal Processing Section: FIG. 9)

FIG. 9 shows an example of a digital signal processing section 20 in the case of a primary-color system.

The primary-color system has a color separation optical system in which the imaging optical system 11 of FIG. 8 separates light from a subject into color light of each of RGB, and is a three-plate system having CMOS imaging apparatuses for each RGB color as the CMOS imaging devices 12, or a one-plate system having one CMOS imaging apparatus as the CMOS imaging device 12, in which a color filter for each RGB color is arranged repeatedly in sequence for each pixel on the light incidence plane in the horizontal direction of the picture plane. In this case, primary-color signals for each RGB color are read in parallel from the CMOS imaging devices 12.

In the digital signal processing section 20 of FIG. 9, the black level of the input RGB primary-color signal is clamped to a predetermined level at the clamping circuit 21; the gain of the clamped RGB primary-color signal is adjusted according to the amount of exposure at the gain adjustment circuit 22; and flicker components in the RGB primary-color signal whose gain is adjusted is reduced by a method (to be described later) at flicker reduction sections 25R, 25G, and 25B.

Furthermore, in the digital signal processing section 20 of FIG. 9, white balance of the RGB primary-color signal after flicker is reduced is adjusted at the white-balance adjustment circuit 27; the gradation of the RGB primary-color signal after white balance is adjusted is converted at the gamma correction circuit 28; and an output luminance signal Y and output color-difference signals R-Y and B-Y are generated from the gamma-corrected RGB primary-color signals at the combined matrix circuit 29.

In the primary-color system, in general, since the luminance signal Y is generated after all the processes for the RGB primary-color signals are completed as shown in FIG. 9, by reducing the flicker components in the RGB primary-color signals in the step of processing the RGB primary-color signals as shown in FIG. 9, the flicker components of both the components of each color and the luminance components can be sufficiently reduced.

However, instead of detecting and reducing flicker components for each primary color of RGB by the flicker reduction sections 25R, 25G, and 25B as shown in FIG. 9, for example, the flicker reduction section 25 may be provided on the output side of the luminance signal Y of the combined matrix circuit 29, so that flicker components in the luminance signal Y are detected and reduced.

On the other hand, the complementary-color system is a one-plate system having one CMOS imaging device as the CMOS imaging device 12 of FIG. 8, in which a color filter of the complementary-color system is formed on the light incidence plane.

In the complementary-color system, video signals at two adjacent horizontal line positions are combined and read from the CMOS imaging device 12; in the digital signal processing section 20, the black level of the complementary-color signal (combined signal) is clamped to a predetermined level, the gain of the clamped complementary-color signal is adjusted according to the amount of exposure, and a luminance signal and RGB primary-color signals are generated from the gain-adjusted complementary-color signal.

Then, in the flicker reduction section 25, the flicker components in the luminance signal and the flicker components in the RGB primary-color signals are reduced, and the gradation of the luminance signal after flicker is reduced is corrected, obtaining the output luminance signal Y. Also, white balance of the RGB primary-color signal after flicker is adjusted, the gradation of the RGB primary-color signal after white balance is adjusted is converted, and color-difference signals R-Y and B-Y are generated from the RGB primary-color signals after gamma correction.

[Embodiment of Shutter Control (Setting of Shutter Speed): FIGS. 10 to 16]

In the present invention, the shutter is controlled and the shutter speed is set by the method described below.

(The case of the NTSC system or the PAL System: FIGS. 10 to 14 and FIG. 16)

In the case of a video camera which is selectively set to either the NTSC system or the PAL system in the manner described above, the shutter control section 14c of the system controller 14 performs a shutter control process described below for each field so that the shutter speed is set.

Figure 10:
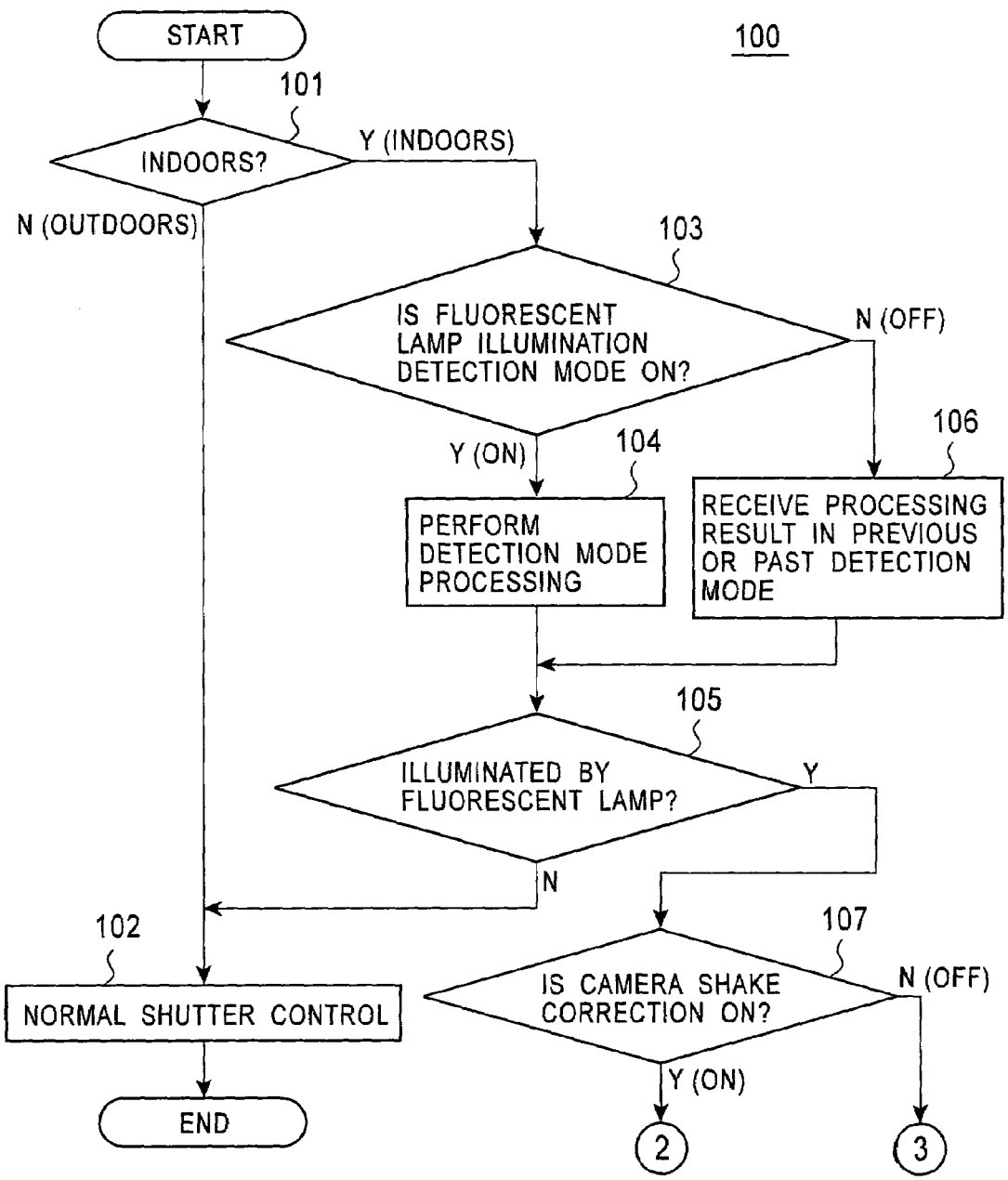
FIG. 10 shows a part of an example of a shutter control process (shutter control process routine) performed by a shutter control section.
Figure 11:
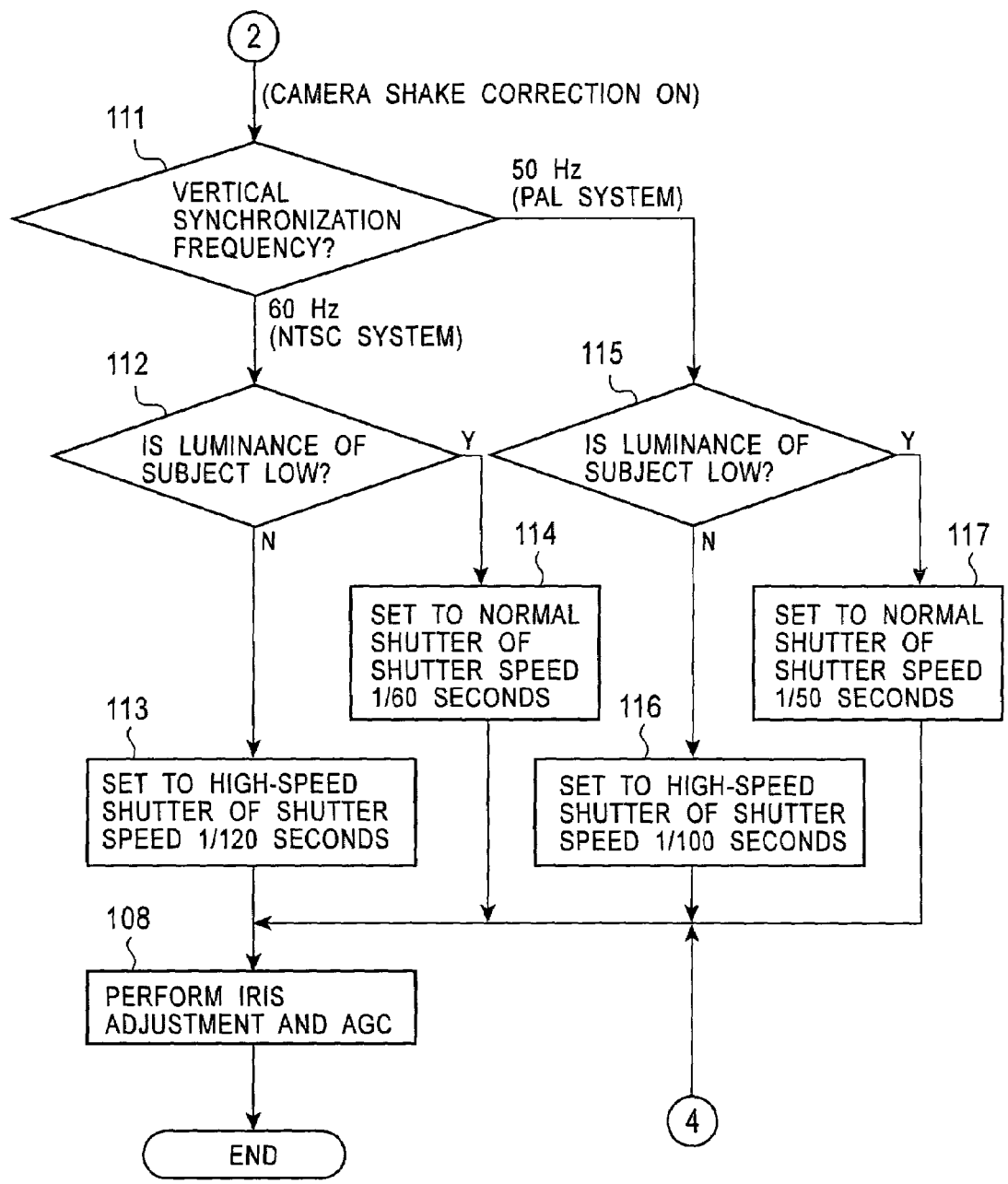
FIG. 11 shows another part of the example of the shutter control process performed by the shutter control section.

FIGS. 10 to 12 show an example of a shutter control process routine performed by the shutter control section 14c. In a shutter control process routine 100 of this example, initially, in step 101, it is determined whether or not the photographic environment is indoors.

For the determination as to whether or not the photographic environment is indoors, the brightness information of AE (Auto Exposure) control, the color temperature information of white balance control, etc., used for normal camera control, can be used.

Then, in the case of outdoor photographing, since the flicker reduction process is not necessary from the beginning, the process proceeds from step 101 to step 102, where normal shutter control is performed, that is, an electronic shutter is set in the normal exposure control mode, completing the shutter control process.

On the other hand, in the case of indoor photographing, since there is a possibility that a subject is illuminated by a fluorescent lamp, the process proceeds from step 101 to step 103, where it is determined whether or not the fluorescent-lamp illumination detection mode is ON.

The on/off state of the fluorescent-lamp illumination detection mode is set by the system controller 14 itself, and is controlled in such a manner that, when the imaging apparatus is powered on or when the subject information (the brightness and the color temperature of the subject) is greatly changed, the detection mode is turned on, and the detection mode is turned off in a steady state.

Then, when the fluorescent-lamp illumination detection mode is ON, the process proceeds from step 103 to step 104, where detection mode processing is performed. Thereafter, the process proceeds to step 105, where it is determined whether or not the photographic environment is under the illumination of a fluorescent lamp on the basis of the processing result.

As a method for detecting whether or not the photographic environment is under the illumination of a fluorescent lamp, there is a method of using color temperature information of white balance control. According to the method shown in FIGS. 13A, 13B, and 13C, and 14, detection is possible with higher accuracy.

Figure 13C:
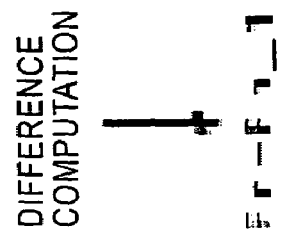
FIGS. 13A, 13B, and 13C illustrate an example of a method for detecting whether or not a subject is illuminated by a fluorescent lamp.
Figure 13B:
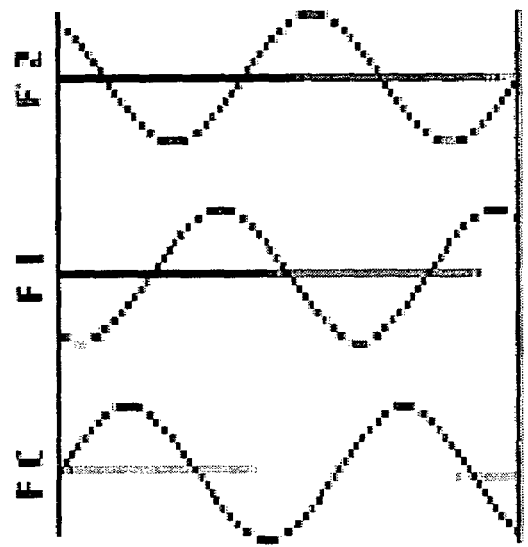
Figure 13A:
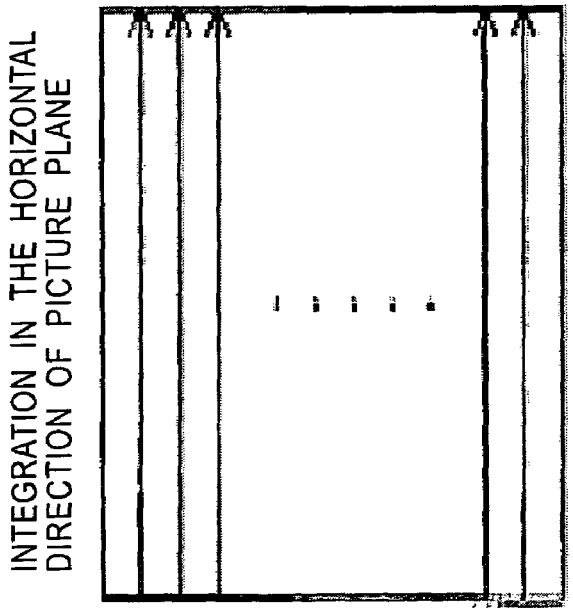

In the method of FIGS. 13A, 13B, and 13C, as shown in FIG. 13A, the video signal (each color signal or the luminance signal) obtained at the digital signal processing section 20 is integrated in the horizontal direction of the picture plane, obtaining an integrated value for each field (the waveform of FIG. 13B shows flicker components), and as shown in FIG. 13C, the difference ($F_n - F_{n-1}$) of the integrated value between adjacent fields is computed.

At this time, when flicker having continuity in a time axis, that is, flicker whose repetition period is a plurality of fields (a plurality of picture planes), occurs as in case 1 (fv=60 Hz, fp=50 Hz) shown in FIG. 5A or in case 2 (fv=50 Hz, fp=60 Hz) shown in FIG. 5B, since the picture pattern components are removed and only the flicker components remain in the difference (Fn−Fn$_{-1}$), it is possible to detect that the photographic environment is under the illumination of a fluorescent lamp on the basis of the presence of the flicker components.

However, at this time, when flicker that completes in one field (one picture plane) in which the stripe pattern of flicker becomes the same in each field (each picture plane) occurs during the high-speed shutter time as in case 3 (fv=60 Hz, fp=60 Hz) shown in FIG. 6A or in case 4 (fv=50 Hz, fp=50 Hz) shown in FIG. 6B, not only are the picture pattern components removed, but also the flicker components are removed from the difference (Fn−Fn$_{-1}$). Thus, it is not possible to detect that the photographic environment is under the illumination of a fluorescent lamp.

Therefore, in the method of this example, the system controller 14 drives the imaging apparatus by slightly disrupting the constantness of the vertical period only during the detection mode.

More specifically, FIG. 14A shows case 3 (fv=60 Hz, fp=60 Hz), and FIG. 14B shows case 4 (fv=50 Hz, fp=50 Hz). During the detection mode, as each case is shown on the right side (the direction of the arrow), the vertical period (the time from a particular vertical synchronization signal VD to the next vertical synchronization signal VD) is alternately increased or decreased by α (seconds) every vertical period.

The same applies to case 1 and case 2. That is, during the detection mode, the constantness of the vertical period is slightly disrupted in this manner regardless of whether the set vertical synchronization frequency fv of the imaging apparatus is 60 Hz or 50 Hz and without detecting whether the power-supply frequency fp is 50 Hz or 60 Hz.

As a result, also, in case 3 and case 4, flicker components appear in the difference (Fn−Fn$_{-1}$) under the illumination of a fluorescent lamp, and thus, it is possible to detect that the photographic environment is under the illumination of a fluorescent lamp.

As the flicker reduction method, when the method of the invention of the earlier application (Japanese Patent Application No. 2003-173642) by the same inventors as those of the present invention is used as in an embodiment (to be described later), the circuit block used in that flicker reduction method can also be used for integration and difference computations shown in FIGS. 13A, 13B, and 13C.

When it is determined in step 103 that the fluorescent-lamp illumination detection mode is in a steady state of OFF, the process proceeds to step 106, where the processing results (determination results) in the previous or past detection mode are received, and the process then proceeds to step 105.

Then, when it is determined in step 105 that the photographic environment is not under the illumination of a fluorescent lamp, since the flicker reduction process is not necessary from the beginning, similarly to the case of outdoor photographing, the process proceeds to step 102, where normal shutter control is performed, completing the shutter control process.

On the other hand, when it is determined in step 105 that the photographic environment is under the illumination of a fluorescent lamp, the process proceeds to step 107, where it is determined whether or not camera-shake correction is ON.

Then, when camera-shake correction is ON, that is, when camera-shake correction is to be performed, the process proceeds from step 107 to step 111, where it is determined whether the set vertical synchronization frequency fv is 60 Hz or 50 Hz on the basis of the above-described setting flag, and the shutter is set to a high-speed shutter of a shutter speed corresponding to the determination result.

In this case, when camera-shake correction is ON, the shutter may always be set to a high-speed shutter. However, when the luminance (brightness) of the subject is very low (dark) and the optimum exposure takes precedence over the improvement of the image quality by the high-speed shutter when the camera-shake correction is performed, the shutter may be set exceptionally to a normal shutter. The following example shows a case in which the shutter is set to a high-speed shutter in principle and is set exceptionally to a normal shutter when the camera-shake correction is ON in this manner.

That is, when it is determined in step 111 that fv=60 Hz (the NTSC system), the process proceeds to step 112, where it is determined whether or not the luminance of the subject is lower than a threshold value. When it is determined that the luminance of the subject is greater than or equal to the threshold value, the process proceeds to step 113, where, by setting N=1 at N/120 (seconds) described above, the shutter is set to a high-speed shutter with a shutter speed (exposure time) of $\frac{1}{120}$ seconds.

Furthermore, when it is determined in step 112 that the luminance of the subject is lower than the threshold value, the process proceeds to step 114, where, by setting N=2 at N/120 (seconds) described above, the shutter is set to a normal shutter with a shutter speed of $\frac{1}{60}$ seconds.

On the other hand, when it is determined in step 111 that fv=50 Hz (the PAL system), the process proceeds to step 115, where it is determined whether or not the luminance of the subject is lower than the threshold value. When it is determined that the luminance of the subject is greater than or equal to the threshold value, the process proceeds to step 116, where, by setting N=1 at N/100 (seconds) described above, the shutter is set to a high-speed shutter with a shutter speed of $\frac{1}{100}$ seconds.

Furthermore, when it is determined in step 115 that the luminance of the subject is less than the threshold value, the process proceeds to step 117, where, by setting N=2 at N/100 (seconds) described above, the shutter is set to a normal shutter with a shutter speed of $\frac{1}{50}$ seconds.

That is, when fv=60 Hz as in case 1 or case 3, in principle, the shutter is set to a high-speed shutter with a shutter speed of $\frac{1}{120}$ seconds when camera-shake correction is ON. When fv=50 Hz as in case 2 or case 4, in principle, the shutter is set to a high-speed shutter with a shutter speed of $\frac{1}{100}$ seconds when camera-shake correction is ON.

Therefore, in case 1 or case 2, flicker having continuity in a time axis, that is, flicker whose repetition period is three fields or five fields, respectively, occurs. Thus, it is possible to reduce flicker components by the flicker reduction method using the continuity of flicker. Also, in case 3 or case 4, flicker does not occur to begin with, and the flicker reduction process is not necessary.

Moreover, for this reason, it is not necessary to detect the power-supply frequency fp, and the shutter control section 14c need only make a determination as to whether the set video system is the NTSC system or the PAL system (as to whether the vertical synchronization frequency fv is 60 Hz or 50 Hz). Furthermore, when the camera-shake correction is ON, a high-speed shutter can be realized in principle, and the improvement in image quality by the high-speed shutter can be achieved.

After the shutter speed is set in step 113, 114, 116, or 117, the process proceeds to step 118, where iris adjustment and AGC are performed in accordance with the set shutter speed so that the optimum exposure is achieved along with the setting of the shutter speed, completing the shutter control process.

As the high-speed shutter, in general, whereas the shutter is set to a shutter speed of approximately 1/100 seconds in the manner described above, in step 113 in the case of fv=60 Hz, the shutter is set to 1/120 seconds, which is slightly higher than (shorter in time) 1/100 seconds, and the amount of exposure is slightly decreased when compared to the case of the shutter speed of 1/100 seconds.

However, the difference is approximately 0.8 dB, which can be sufficiently compensated for by iris adjustment and AGC in step 108, and the image quality does not deteriorate due to a decrease in the amount of exposure. Moreover, in the case of the shutter speed of 1/120 seconds, the rough movement of the moving image does not become conspicuous.

On the other hand, when camera-shake correction is OFF, that is, when camera shake correction is not to be performed, the process proceeds from step 107 to step 121, where it is determined whether the set vertical synchronization frequency fv is 60 Hz or 50 Hz on the basis of the above-described setting flag, and the shutter is set to a normal shutter with a shutter speed corresponding to the determination result.

In this case, when camera-shake correction is OFF, the shutter may be always set to a normal shutter for optimum exposure, but when the luminance (brightness) of the subject is very high (bright), the shutter may be exceptionally set to a high-speed shutter. The following example shows a case in which the shutter is set to a normal shutter in principle and is set exceptionally to a high-speed shutter when the camera-shake correction is OFF in this manner.

That is, when it is determined in step 112 that fv=60 Hz (the NTSC system), the process proceeds to step 122, where it is determined whether or not the luminance of the subject is higher than the threshold value. When it is determined that the luminance of the subject is less than or equal to the threshold value, the process proceeds to step 123, where, by setting N=2 at N/120 (seconds) described above, the shutter is set to a normal shutter with a shutter speed (exposure time) of 1/60 seconds.

Furthermore, when it is determined in step 122 that the luminance of the subject is higher than the threshold value, the process proceeds to step 124, where, by setting N=1 at N/120 (seconds) described above, the shutter is set to a high-speed shutter with a shutter speed of 1/120 seconds.

On the other hand, when it is determined in step 121 that fv=50 Hz (the PAL system), the process proceeds to step 125, where it is determined whether or not the luminance of the subject is higher than the threshold value. When it is determined that the luminance of the subject is less than or equal to the threshold value, the process proceeds to step 126, where, by setting N=2 at N/100 (seconds) described above, the shutter is set to a normal shutter with a shutter speed of 1/50 seconds.

Furthermore, when it is determined in step 125 that the luminance of the subject is higher than the threshold value, the process proceeds to step 127, where, by setting N=1 at N/100 (seconds) described above, the shutter is set to a high-speed shutter with a shutter speed of 1/100 seconds.

After the shutter speed is set in step 123, 124, 126, or 127, the process proceeds to step 108, where iris adjustment and AGC are performed in accordance with the set shutter speed so that the optimum exposure is achieved along with the setting of the shutter speed, completing the shutter control process.

The above shutter control process is shown in the column in which the vertical synchronization frequency is 60 Hz or 50 Hz in FIG. 16. The shutter speeds indicated within the parentheses when the camera-shake correction is ON and the camera-shake correction is OFF are exceptional shutter speeds set in steps 114, 117, 124, and 127. The shutter speeds indicated outside the parentheses thereabove are shutter speeds, which are set in principle in steps 113, 116, 123, and 126.

Figure 15:
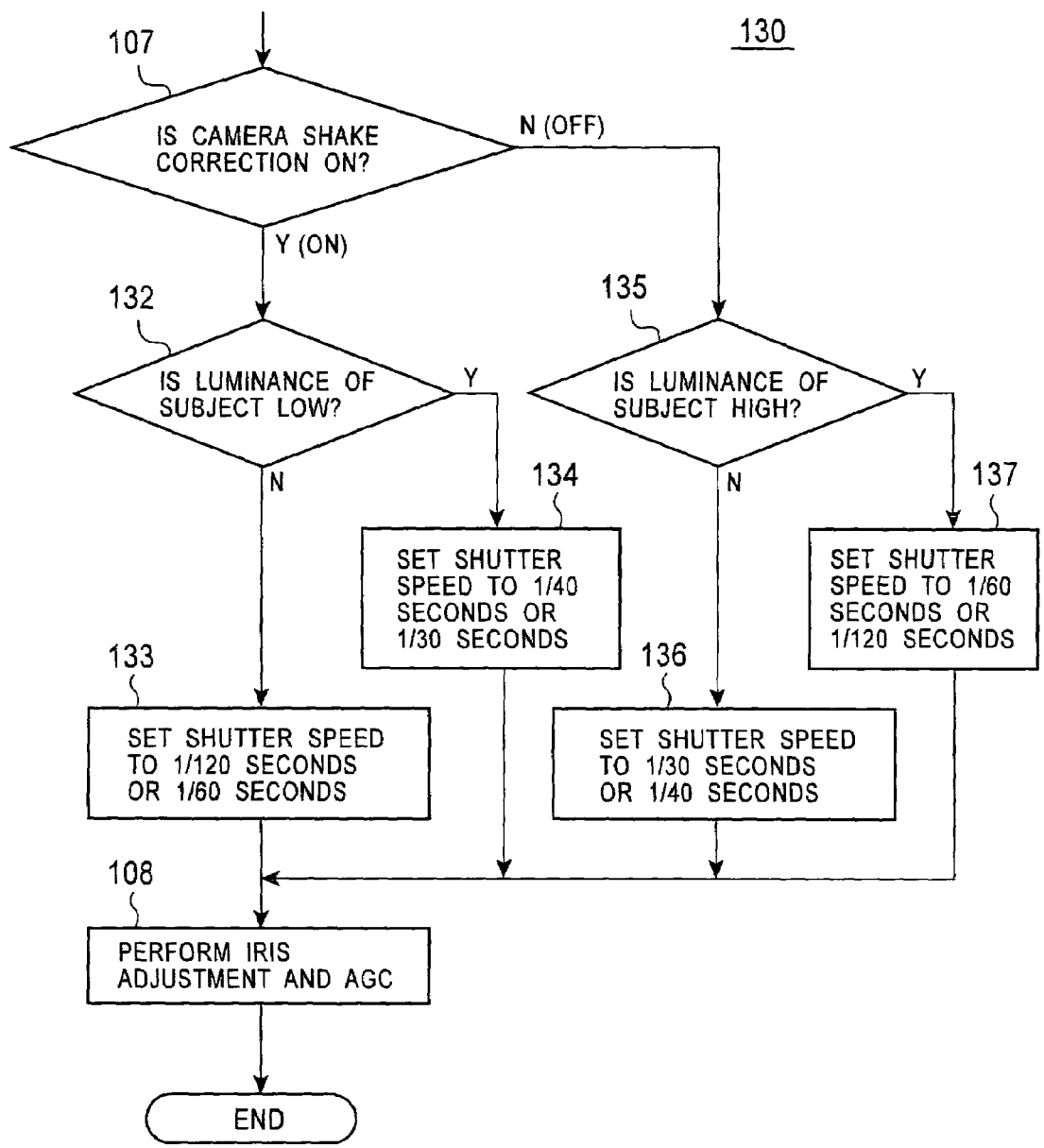
FIG. 15 shows a part of another example of a shutter control process performed by a shutter control section.

(Case of Progressive System: FIGS. 15 and 16)

The shutter control of the present invention can also be applied to a case in which the vertical synchronization frequency (the frame frequency in this case) fv is, for example, 30 Hz, in a CMOS imaging-apparatus of the progressive system, such as a digital still camera.

The imaging apparatus in this case is also configured basically as shown in FIG. 8. The shutter control section 14c of the system controller 14 performs a shutter control process described below for each frame and sets the shutter speed.

FIG. 15 shows an example of a shutter control process routine performed by the shutter control section 14c. In a shutter control process routine 130 of this example, the steps from the start of the shutter control process up to step 107 are the same as the steps from the start of the shutter control process of the shutter control process routine 100 up to step 107.

Then, in the shutter control process routine 130 of this example, when the photographic environment is under the illumination of a fluorescent lamp, it is determined in step 107 whether or not camera-shake correction is ON. When camera-shake correction is ON, that is, when camera-shake correction is to be performed, the shutter is set to a high-speed shutter. When camera-shake correction is OFF, that is, when camera-shake correction is not to be performed, the shutter is set to a normal shutter.

Also, in this case, the shutter may be always set to a high-speed shutter when camera-shake correction is ON, and the shutter may be always set to a normal shutter when camera-shake correction is OFF. The following example shows a case in which the shutter is set to a high-speed shutter in principle and is set exceptionally to a normal shutter when the camera-shake correction is ON, and the shutter is set to a normal shutter in principle and is set exceptionally to a high-speed shutter when the camera-shake correction is OFF.

That is, when it is determined in step 107 that camera-shake correction is ON, the process proceeds to step 132, where it is determined whether or not the luminance of the subject is less than a threshold value V2. When it is determined that the luminance of the subject is greater than or equal to the threshold value V2, the process proceeds to step 133, where, by setting N=1 or N=2 at N/120 (seconds) described above, the shutter speed (exposure time) is set to 1/120 seconds or 1/60 seconds.

More specifically, when the shutter is set to a higher shutter speed for the purpose of camera-shake correction, the shutter speed is set to 1/120 seconds. Furthermore, in a case where the shutter speed is subdivided according to the luminance of the subject, when the luminance of the subject is a predetermined value V1 (>V2) or higher in the range where the luminance is greater than or equal to the threshold value V2, the shutter speed is set to 1/120 seconds. When the luminance of the subject is less than the predetermined value V1 in the range where the luminance is greater than or equal to the threshold value V2, the shutter speed is set to 1/60 seconds.

Furthermore, when it is determined in step 132 that the luminance of the subject is less than the threshold value V2, the process proceeds to step 134, where, by setting N=3 or N=4 at N/120 (seconds) described above, the shutter speed (exposure time) is set to 1/40 seconds or 1/30 seconds.

More specifically, when the shutter is set to a lower shutter speed for the purpose of optimum exposure, the shutter speed is set to 1/30 seconds. Furthermore, in a case where the shutter speed is subdivided according to the luminance of the subject, when the luminance of the subject is less than a predetermined value V3 (<V2) in the range where the luminance is less than the threshold value V2, the shutter speed is set to 1/30 seconds. When the luminance of the subject is greater than or equal to the predetermined value V3 in the range where the luminance is less than the threshold value V2, the shutter speed is set to 1/40 seconds.

On the other hand, when it is determined in step 107 that the camera-shake correction is OFF, the process proceeds to step 135, where it is determined whether or not the luminance of the subject is higher than a threshold value V4. When it is determined that the luminance of the subject is less than the threshold value V4, the process proceeds to step 136, where, by setting N=4 or N=3 at N/120 (seconds) described above, the shutter speed (exposure time) is set to 1/30 seconds or 1/40 seconds.

Furthermore, when it is determined in step 135 that the luminance of the subject is higher than the threshold value V4, the process proceeds to step 137, where, by setting N=2 or N=1 at N/120 (seconds) described above, the shutter speed (exposure time) is set to 1/60 seconds or 1/120 seconds.

After the shutter speed is set in step 133, 134, 136, or 137, the process proceeds to step 108, where iris adjustment and AGC are performed, completing the shutter control process.

The above shutter control process is shown in the column in which the vertical synchronization frequency is 30 Hz in FIG. 16. As described above, in the above-described case 5 or 6, since the shutter speed is set to 1/120 seconds, 1/60 seconds, 1/40 seconds, or 1/30 seconds, in case 5 in which fp=50 Hz, flicker having continuity in a time axis, that is, flicker whose repetition period is three frames, occurs, and thus flicker components can be reduced by the flicker reduction method using the continuity of flicker. Furthermore, in case 6 in which fp=60 Hz, flicker does not occur to begin with, and the flicker reduction process is not necessary.

Moreover, for this reason, it is not necessary to detect the power-supply frequency fp, and also, when the camera-shake correction is ON, a high-speed shutter can be realized in principle. Thus, the improvement in the image quality by the high-speed shutter can be achieved.

[Embodiment of Flicker Reduction Method: FIGS. 17 to 22]

When a subject is illuminated by a fluorescent lamp, after the shutter is controlled by the shutter control section 14c in the manner described above, the flicker reduction process is further performed by the flicker reduction section 25 inside the digital signal processing section 20 under the control of the system controller 14.

As shown in FIG. 16, in case 3 (fv=60 Hz, fp=60 Hz), case 4 (fv=50 Hz, fp=50 Hz), or case 6 (fv=30 Hz, fp=60 Hz), as a result of the shutter speed being set in the manner described above, flicker does not occur, and the flicker reduction process is not necessary. However, since the power-supply frequency fp is not detected to begin with, also, in these cases, the flicker reduction process described below is performed similarly to case 1 (fv=60 Hz, fp=50 Hz), case 2 (fv=50 Hz, fp=60 Hz), or case 5 (fv=30 Hz, fp=50 Hz).

For the flicker reduction method in this case, as described above, any method may be used as long as it is a method in which flicker components are reduced by estimating flicker components using the continuity of flicker from the video signal from the imaging device and by correcting the video signal from the imaging apparatus according to the estimated result in the manner described above. In particular, according to the flicker reduction method of the invention of the earlier application (Japanese Patent Application No. 2003-173642) by the same inventors as those of the present invention, flicker components specific to an XY address scanning-type imaging device such as a CMOS imaging device can be detected with high accuracy, and can be reduced reliably and sufficiently by simple signal processing regardless of the subject, the video signal level, and the type of fluorescent lamp.

The flicker reduction method of the invention of the earlier application includes (a) a step of using a video signal from an imaging apparatus and integrating the input image signal over the time of one horizontal period or more; (b) a step of normalizing the integration value, or the difference value of the integration values in adjacent fields or frames; (c) a step of extracting the spectrum of the normalized integration value or the normalized difference value; (d) a step of estimating flicker components from the extracted spectrum; and (e) a step of computing the estimated flicker components and the input image signal so as to cancel out the estimated flicker components.

In this case, in the normalization step (b), as described later, (b1) the difference value is divided by the average value of the integrated values in a plurality of continuous fields or in a plurality of continuous frames, or (b2) the integrated value is divided by the average value of the integrated values in the plurality of continuous fields or in the plurality of continuous frames, and a predetermined value is subtracted from the division result, or (b3) the difference value is divided by the integrated value. Furthermore, in the spectrum extraction step (c), a method of performing a Fourier transform on the normalized integrated value or the difference value is used.

(Example of the Flicker Reduction Method: FIGS. 17 to 22)

Figure 17:
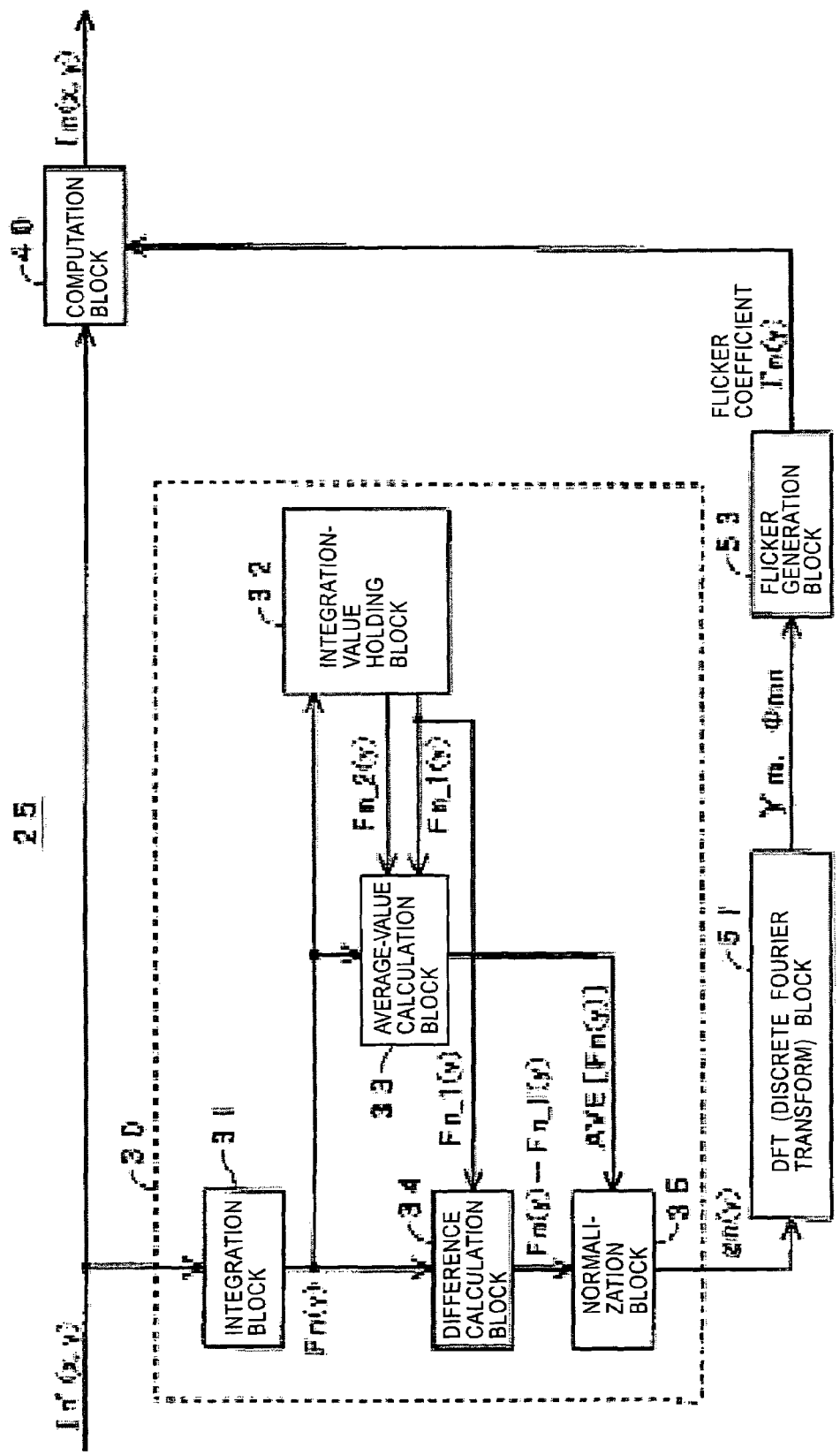
FIG. 17 shows an example of a flicker reduction section.

When the flicker reduction method of the invention of the earlier application is used, the flicker reduction sections 25R, 25G, and 25B for the RGB primary-color signals of the primary-color system shown in FIG. 9 and the flicker reduction section 25 for the RGB primary-color signals and the luminance signal of the complementary-color system (not shown) are configured, for example, as shown as the flicker reduction section 25 in FIG. 17.

However, the following example shows the case of a CMOS video camera of the NTSC system (fv=60 Hz), in which, as described above, under the illumination of a fluorescent lamp, flicker having continuity in a time axis, that is, flicker whose repetition period is three fields, occurs when fp=50 Hz, and flicker does not occur to begin with when fp =60 Hz. In the case of a CMOS video camera of the PAL system (fv=50 Hz), a CMOS video camera which is selectively set to either the NTSC system or the PAL system, or a CMOS video camera of the progressive system with fv=30 Hz will be described later.

In the following, the input image signal is the RGB primary-color signals or the luminance signal before the flicker reduction process is performed thereon, which is input to the flicker reduction section 25, and the output image signal is the RGB primary-color signal or the luminance signal after the flicker reduction process is performed thereon, which is output from the flicker reduction section 25.

Figure 1:
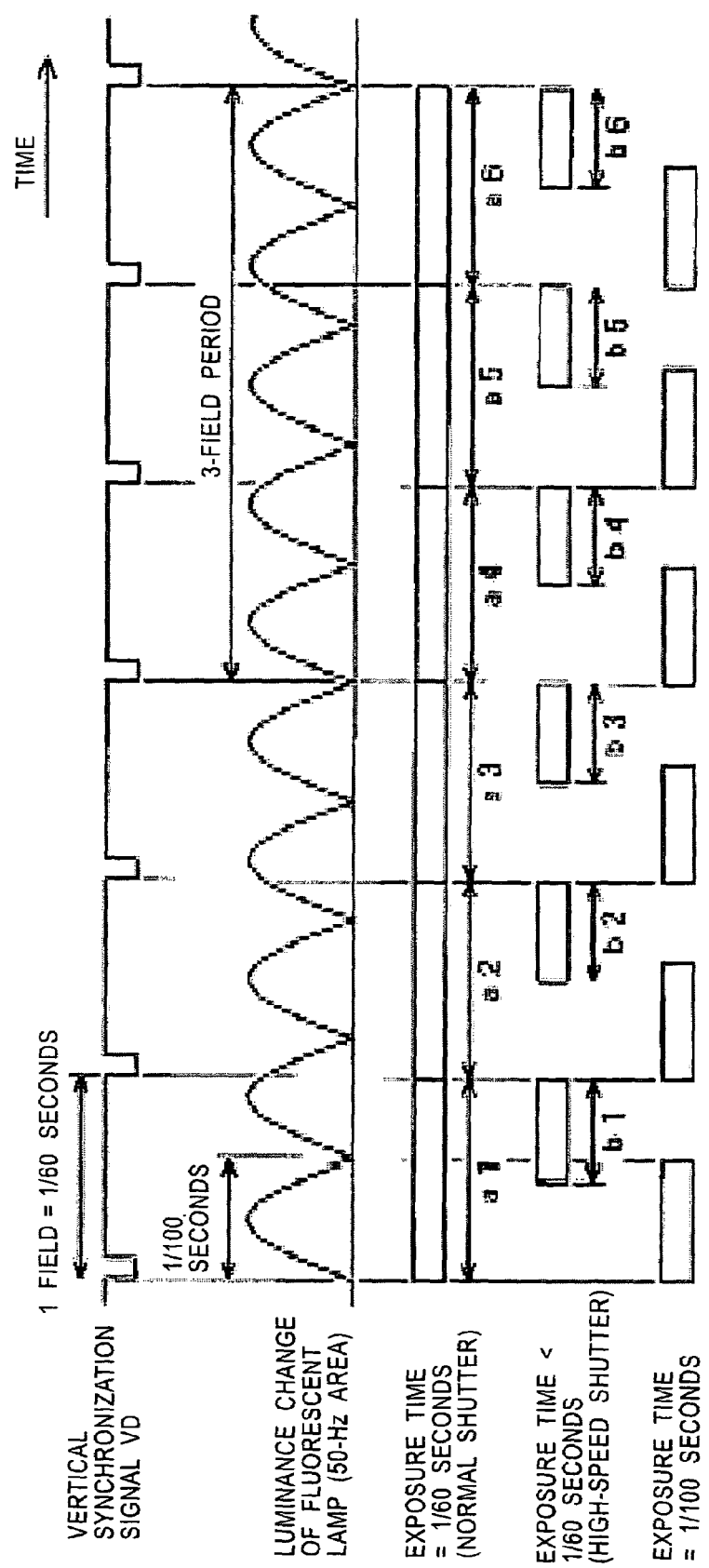
FIG. 1 illustrates fluorescent-lamp flicker in a CCD imaging apparatus in a case in which image capturing is performed by a CCD imaging apparatus of the NTSC system (vertical synchronization frequency=60 Hz)
Figure 2:
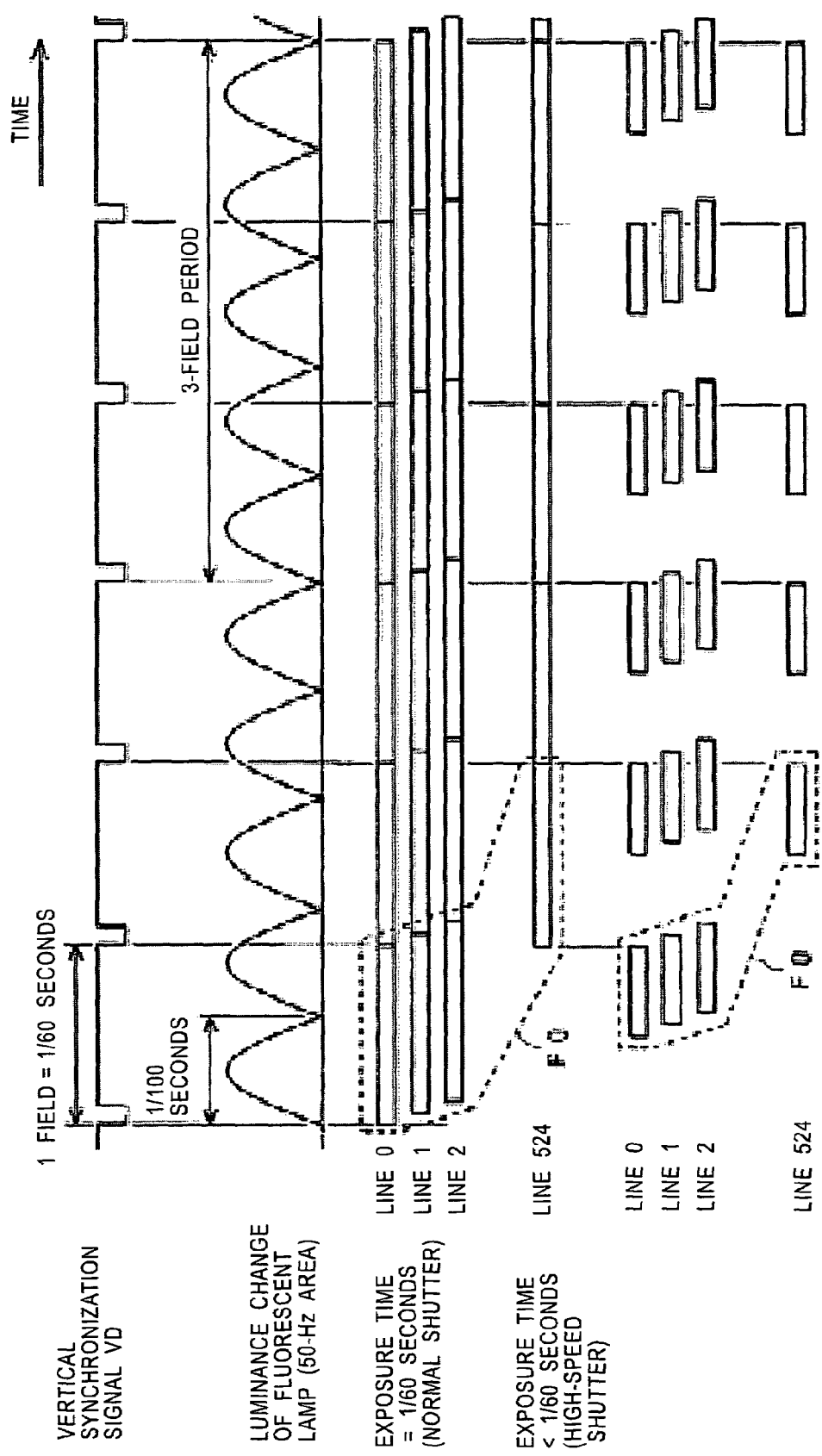
FIG. 2 illustrates fluorescent-lamp flicker in a CMOS imaging apparatus in a case in which image capturing is performed by a CMOS imaging apparatus of the NTSC system (vertical synchronization frequency=60 Hz)
Figure 3:
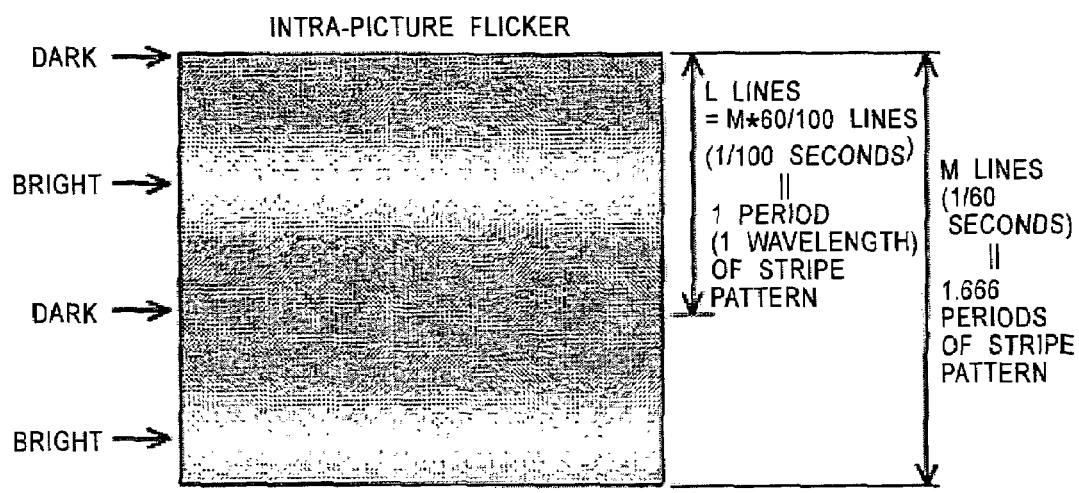
FIG. 3 shows a stripe pattern of fluorescent-lamp flicker within one picture plane in the CMOS imaging apparatus.
Figure 4:
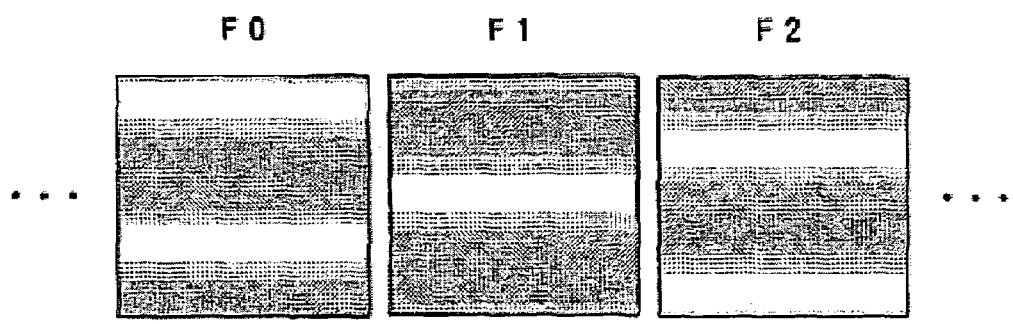
FIG. 4 shows stripe patterns of fluorescent-lamp flicker over three continuous picture planes in the CMOS imaging apparatus.

FIGS. 3 and 4 show a case in which the subject is uniform. In general, flicker components are proportional to the signal intensity of the subject.

Therefore, if the input image signal (the RGB primary-color signal or the luminance signal before the flicker reduction process is performed thereon) in an arbitrary field n and in an arbitrary pixel (x, y) with respect to an ordinary subject is denoted as In' (x, y), In' (x, y) is represented as the sum of the signal components which do not contain flicker components and flicker components proportional thereto on the basis of equation (1) of FIG. 18.

In (x, y) indicates signal components, Γn (y)*In (x, y) indicates flicker components, and Γn (y) indicates a flicker coefficient. One horizontal period is sufficiently short in comparison with the light-emission period of a fluorescent lamp (1/100 seconds when fp=50 Hz, and 1/120 seconds when fp=60 Hz), and the flicker coefficient can be assumed to be constant in the same line of the same field. Thus, the flicker coefficient is denoted as Γn (y).

In order to generalize Γn (y), as shown in equation (2) of FIG. 18, the flicker coefficient is described in a form in which the flicker coefficient is expanded to a Fourier series. As a result, the flicker coefficient can be represented in a form in which light-emitting characteristics and persistence characteristics, which differ depending on the type of fluorescent lamp, are all covered.

λo in equation (2) indicates the wavelength of in-plane flicker shown in FIG. 3. If the number of reading lines per field is denoted as M, it corresponds to L (=M*60/100) lines when fp=50 Hz. ωo indicates a normalized angular velocity which is normalized by λo.

γm indicates the amplitude of flicker components of each order (m=1, 2, 3 ... ). Φmn indicates the initial phase of the flicker components of each order, which is determined by the light-emitting period of the fluorescent lamp and the exposure timing. However, when fv=60 Hz, since Φm becomes the same value every three fields, the difference of Φm with the previous field is represented by equation (3) of FIG. 18.

In the example of FIG. 17, initially, in order to reduce the influence of the picture pattern for the purpose of detecting flicker, the input image signal In' (x, y) is integrated over one line in the horizontal direction of the picture plane by the integration block 31, thus computing the integrated value Fn (y) as indicated in equation (4) of FIG. 18. αn (y) in equation (4) indicates an integrated value over one line of the signal components In (x, y), as indicated in equation (5) of FIG. 18.

The computed integrated value Fn (y) is stored and held in the integration-value holding block 32 for the purpose of detecting flicker in subsequent fields. When fv=60 Hz, the integration-value holding block 32 is configured so as to hold integrated values for at least two fields.

If the subject is uniform, since the integrated value αn (y) of the signal components In (x, y) becomes a constant value, it is easy to extract flicker components αn (y)*Γn (y) from the integrated value Fn (y) of the input image signal In' (x, y).

However, in an ordinary subject, since m*ωo components are also contained in αn (y), it is not possible to separate between luminance components and color components as flicker components and luminance components and color components as the signal components of the subject itself, and it is not possible to purely extract only the flicker components. Furthermore, since the flicker components of the second term of equation (4) is very small in comparison with the flicker components in the first term, most of the flicker components are buried in the signal components, and it is not possible to directly extract the flicker components from the integrated value Fn (y).

Therefore, in the example of FIG. 17, an integrated value in three continuous fields is used to remove the influence of αn (y) from the integrated value Fn (y).

More specifically, in this example, when the integrated value Fn (y) is computed, an integrated value $Fn_{-1}$ (y) of the same line one field before and an integrated value $Fn_{-2}$ (y) of the same line two fields before are read from the integration-value holding block 32, and an average value AVE [Fn (y)] of the three integrated values Fn (y), $Fn_{-1}$ (y), and $Fn_{-2}$ (y) is computed at an average-value calculation block 33.

If the subject in the period of three continuous fields can be assumed as almost the same, αn (y) can be assumed as the same value. If the motion of the subject is sufficiently small between three fields, this assumption does not pose a problem in practical terms. Furthermore, the computation of the average value of the integrated values in three continuous fields is such that signals in which the phase of the flicker components is shifted in sequence by (−2π/3)*m on the basis of the relationship of equation (3) are added together, with the result that the flicker components are cancelled out with each other. Therefore, the average value AVE [Fn (y)] is represented by equation (6) of FIG. 19.

The foregoing shows a case in which, assuming that the approximation of equation (7) of FIG. 19 holds, the average value of the integrated values in three continuous fields is computed. However, if the motion of the subject is large, the approximation of equation (7) of FIG. 19 does not hold.

For this reason, the flicker reduction section 25 for which a case in which the motion of the subject is large is assumed need only hold the integrated values over the three or more fields in the integration-value holding block 32 so as to compute the average value of the integrated values over the four or more fields together with the integrated value Fn (y) of the corresponding field. As a result, the low-pass filter action in the direction of the time axis causes the influence as a result of the subject being moved to be decreased.

However, since flicker repeats every three fields, in order to cancel out the flicker components, it is necessary to compute the average value of the integrated values of j (an integral multiple which is twice 3, that is, 6, 9 ... ) continuous fields, and the integration-value holding block 32 is configured to hold integrated values for at least (j-1) fields.

The example of FIG. 17 shows a case in which the approximation of equation (7) of FIG. 19 holds. In this example, furthermore, a difference calculation block 34 calculates the difference between the integrated value Fn (y) of the corresponding field from the integration block 31 and the integrated value $Fn_{-1}$ (y) one field before from the integration-value holding block 32, and the difference value Fn (y)−$Fn_{-1}$ (y) represented by equation (8) of FIG. 19 is computed. Equation (8) also presupposes that the approximation of equation (7) holds.

In the difference value Fn (y)−$Fn_{-1}$ (y), since the influence of the subject is sufficiently removed, the state of the flicker components (flicker coefficient) appears clearly in comparison with the integrated value Fn (y).

In the example of FIG. 17, furthermore, at the normalization block 35, the difference value Fn (y)−$Fn_{-1}$ (y) from the difference calculation block 34 is normalized as a result of being divided by the average value AVE [Fn (y)] from the average-value calculation block 33, and a difference value gn (y) after normalization is computed.

The difference value gn (y) after normalization is expanded as indicated in equation (9) of FIG. 20 by equations (6) and (8) of FIG. 19 and the sum and product formulas of trigonometric functions, and the difference value is further represented by equation (10) of FIG. 20 on the basis of equation (3) of FIG. 18. |Am| and θm in equation (10) are represented by equations (11a) and (11b).

In the difference value Fn (y)−$Fn_{-1}$ (y), since the influence of the signal intensity of the subject remains, the levels of the luminance change and the color change due to flicker differ depending on the area. However, as a result of being normalized in the manner described above, the luminance change and the color change due to flicker can be adjusted to the same level over the entire area.

|Am| and θm represented in equations (11a) and (11b) of FIG. 20 are the amplitude and the initial phase of the spectrum of each order, of the difference value gn (y) after normalization, respectively. If a Fourier transform is performed on the difference value gn (y) after normalization and the amplitude |Am| and the initial phase θm of the spectrum of each order are detected, equations (12a) and (12b) of FIG. 21 make it possible to determine the amplitude γm and the initial phase θmn of the flicker components of each order, shown in equation (2) of FIG. 18.

Therefore, in the example of FIG. 17, at a DFT block 51, a discrete Fourier transform is performed on data corresponding to the amount of one wavelength (the amount of L lines) of flicker, of the difference value gn (y) after normalization from the normalization block 35.

If a DFT computation is denoted as DFT [gn (y)] and the DFT result of the order m is denoted as Gn (m), the DFT computation is represented by equation (13) of FIG. 21. W in equation (13) is represented by equation (14). Furthermore, based on the definition of DFT, the relationships between equations (11a) and (11b) and equation (13) are represented by equations (15a) and (15b) of FIG. 21.

Therefore, based on equations (12a), (12b), (15a), and (15b), the amplitude γm and the initial phase Φmn of the flicker components of each order can be determined by equations (16a) and (16b) of FIG. 21.

The reason why the data length of a DFT computation is made to be one wavelength (L lines) of flicker is that this makes it possible to directly obtain a group of discrete spectrums, which is just an integral multiple of ωo.

In general, as a Fourier transform for digital signal processing, an FFT (Fast Fourier Transform) is used. However, in this example, a DFT is consciously used. The reason for this is that, since the data length of the Fourier transform is not a 2 raised to a higher power, DFT is more convenient than FFT. However, as a result of processing input and output data, FFT can also be used.

Under an actual illumination of a fluorescent lamp, even if the order m is limited to an order of several magnitudes, since flicker components can be approximated sufficiently, for the DFT computation, all the data need not to be output, and there are no demerits in the computation efficiency when compared to the FFT.

In the DFT block 51, first, the spectrum is extracted by the DFT computation defined by equation (13), and thereafter, the amplitude γm and the initial phase Φmn of the flicker components of each order are estimated by the computations of equations (16a) and (16b).

In the example of FIG. 17, furthermore, in the flicker generation block 53, a flicker coefficient Γn (y) represented by equation (2) of FIG. 18 is computed from the estimated values of γm and Φmn from the DFT block 51.

However, as described above, even if the order m is limited to an order of several magnitudes under the actual illumination of a fluorescent lamp, since flicker components can be approximated sufficiently, when counting the flicker coefficient Γn (y) based on equation (2), the sum order can be limited to a predetermined order, for example, a second order rather than being set to infinity.

According to the above-described method, even in an area, such as a black background portion and a low illumination portion having very small flicker components, in which flicker components are buried completely in the signal components at the integrated value Fn (y), the difference value Fn (y)–Fn$_{-1}$ (y) is computed, and this is normalized by the average value AVE [Fn (y)], making it possible to detect the flicker components with high accuracy.

Furthermore, the estimation of the flicker components from the spectrum up to an appropriate order results in the approximation without completely reproducing the difference value gn (y) after normalization. As a result, on the contrary, even if a non-continuous portion occurs in the difference value gn (y) after normalization depending on the status of the subject, it is possible to estimate the flicker components of that portion with high accuracy.

Based on equation (1) of FIG. 18, the signal components In (x, y) in which flicker components are not contained are represented by equation (17) of FIG. 21.

Therefore, in the example of FIG. 17, in a computation block 40, 1 is added to the flicker coefficient Γn (y) from the flicker generation block 53, and the input image signal In' (x, y) is divided by the sum [1+Γn (y)].

As a result, the flicker components contained in the input image signal In' (x, y) are removed nearly completely, and from the computation block 40, signal components In (x, y) in which flicker components are not substantially contained are obtained as an output image signal (the RGB primary-color signal or the luminance signal after the flicker reduction process).

When all the above-described processes cannot be completed within the time of one field due to the limitation of the computation power possessed by the system, by using the fact that flicker repeats every three fields, a function for holding the flicker coefficient Γn (y) over three fields may be provided within the computation block 40, so that the held flicker coefficient Γn (y) is computed on the input image signal In' (x, y) after three fields.

The example of FIG. 17 shows a case in which the difference value Fn (y)–Fn$_{-1}$ (y), rather than the integrated value Fn (y) like another configuration example (to be described later), is normalized by the average value AVE [Fn (y)]. For the sake of convenience, the front-stage part of the DFT block 51 in the flicker reduction section 25 is referred to as a "normalized integrated-value computation block 30".

(Another Configuration Example of Flicker Reduction Section)

If the difference value Fn (y)–Fn$_{-1}$ (y) is normalized by the average value AVE [Fn (y)] as in the example of FIG. 17, a finite calculation accuracy can be ensured effectively. However, when the required calculation accuracy can be satisfied, the integrated value Fn (y) from the integration block 31 may be directly normalized by the average value AVE [Fn (y)].

However, since the difference value gn (y) after normalization in this case is as represented by equation (18) of FIG. 22, to make the processing at the subsequent stage identical to that of the example of FIG. 17, as indicated in equation (19) of FIG. 22, 1 is subtracted from the difference value gn (y) after normalization, represented by equation (18), and the result is sent to the DFT block 51.

In this case, since |Am|=γm and θm=Φmn, based on equations (15a) and (15b) of FIG. 21, γm and Φmn can be determined by equations (20a) and (20b) of FIG. 22.

Therefore, in the DFT block 51, in the example of FIG. 17, after the spectrum is extracted by a DFT computation defined by equation (13), the amplitude γm and the initial phase Φmn of the flicker components of each order are estimated by the computations of equations (16a) and (16b). In comparison, in this case, after the spectrum is extracted by a DFT computation defined by equation (13), the amplitude γm and the initial phase Φmn of the flicker components of each order are estimated by the computations of equations (20a) and (20b). The subsequent processing is the same as that of the example of FIG. 17.

In this case, since the difference calculation block 34 is not necessary, the flicker reduction section 25 can be simplified correspondingly.

In the example of FIG. 17, the average value AVE [Fn (y)] used for the normalization of the difference value Fn (y)–$Fn_{-1}$ (y) is equal to an (y) as indicated in equation (6) when the approximation of equation (7) of FIG. 19 holds, and the second term [αn (y)*Γn (y)] of equation (4) of FIG. 18 is small sufficiently when compared to the αn (y) in the first term. Therefore, the influence of the second term on the normalization is very small.

Therefore, regarding the normalization of the difference value Fn (y)–$Fn_{-1}$ (y), even if the integrated value Fn (y) from the integration block 31 is used instead of the average value AVE [Fn (y)], substantially no problem is posed, and flicker components can be detected effectively similarly to the case in which the average value AVE [Fn (y)] is used.

In this case, the integration-value holding block 32 need only hold the integrated values for one field, and since the average-value calculation block 33 is not required, the flicker reduction section 25 can be simplified.

Each of the above-described examples shows a case in which the input image signal In' (x, y) is integrated over one line. Since the integration of the input image signal In' (x, y) is for the purpose of obtaining sampled values of the flicker components by reducing the influence of the picture pattern, the integration may be performed over the time for a plurality of lines without being limited to one line.

In the case of fv=60 Hz and fp=50 Hz, since one period of the fluorescent-lamp flicker that appears as a stripe pattern on the image plane in the manner described above corresponds to L (=M*60/100), if at least two sampled values are obtained in that one period, that is, L lines, the flicker components can be detected on the basis of the so-called sampling theorem.

In practical terms, it is preferable that several to 10 or more sampled values be obtained in one period of flicker. Even in that case, it is possible to integrate the input image signal In' (x, y) over the time of several to 10 times as more as the horizontal period. Furthermore, the integration time may not be just an integral multiple of the horizontal period like a 2.5 horizontal period.

Then, when the integration time is lengthened in this manner to decrease the number of samplings per unit time, the load of DFT computation on the DFT block 51 can be lessened and also, when the subject is moved in the vertical direction of the picture plane, the influence thereof can be decreased.

In each of the above-described examples, when the level of the input image signal In' (x, y) is in a saturated area, if the computation of equation (17) is performed in the computation block 40, conversely, the signal components (the color components or the luminance components) change.

Therefore, in the computation block 40, preferably, a check is made to determine for each pixel whether or not the level of the input image signal In' (x, y) is higher than or equal to a threshold level of the saturation area. In the pixel in which the level of the input image signal In' (x, y) is lower than the threshold level of the saturated area, the computation result of equation (17) is output as the output image signal In (x, y) in the manner described above. In the pixel in which the level of the input image signal In' (x, y) is higher than or equal to the threshold level, the input image signal In' (x, y) is output as is as the output image signal In (x, y).

According to the above, when the level of the input image signal In' (x, y) is in a saturated area, the signal components (the color components or the luminance components) do not change, and thus an output image signal with high image quality can be obtained.

(Case of Outdoor Photographing or Photographing Under the Illumination of Fluorescent Lamp)

In outdoor photographing and photographing which is not under the illumination of a fluorescent lamp, the flicker reduction process is not necessary from the beginning.

When a still image is to be photographed by a video camera capable of photographing both a moving image and a still image, also, in the CMOS imaging apparatus, the exposure timings (the exposure start timing and the exposure end timing) of all the pixels within one picture plane can be made the same, and the occurrence of fluorescent-lamp flicker can be avoided, making the flicker reduction process unnecessary. In this case, reading of a video signal from the CMOS imaging device can be performed slowly in a state in which light is shielded with the mechanical shutter being closed because there is no limitation of the electronic shutter speed as in the case of photographing a moving image.

When the flicker reduction process is not necessary as in these cases, the flicker reduction section 25 is controlled by the system controller 14 so that the flicker reduction process is not performed in the flicker reduction section 25, and the input image signal In' (x, y) is output as is as the output image signal In (x, y).

(Case of the PAL System and the Progressive System)

The above example shows a CMOS video camera of the NTSC system (fv=60 Hz). In the case of a CMOS video camera of the PAL system (fv=50 Hz), as shown in FIG. 16, when fp=60 Hz under the illumination of a fluorescent lamp, since flicker having continuity in the time axis, that is, flicker whose repetition period is five fields, occurs, the flicker reduction section 25 may be configured so as to deal with the flicker ("three fields" in the case of the NTSC system is replaced with "five fields").

Furthermore, in the case of a CMOS video camera which is selectively set to either the NTSC system or the PAL system as in the embodiment of FIG. 8, when the camera is set to the NTSC system, the flicker reduction section 25 may be configured in such a manner that the flicker reduction section 25 is also switched for use with the NTSC system, and when the camera is set to the PAL system, the flicker reduction section 25 is also switched for use with the PAL system.

Furthermore, in the case of a CMOS video camera of the progressive system with fv=30 Hz, as shown in FIG. 16, when fp=50 Hz under the illumination of a fluorescent lamp, since flicker having continuity in the time axis, that is, flicker whose repetition period is three frames, occurs, the flicker reduction section 25 may be configured so as to deal with the flicker ("fields" in the case of the NTSC system is replaced with "frames", that is, "three fields" is replaced with "three frames").

Other Embodiments

In the case of the CMOS imaging apparatus of the progressive system, the present invention can be applied when the vertical synchronization frequency fv is not 30 Hz, but, for example, 40 Hz or 25 Hz. In this case, when fv=40 Hz, since 120/fv is an integer, the shutter may be set to a shutter speed with an exposure time of N/120 (seconds) under the illumination of a fluorescent lamp, and when fv=25 Hz, since 100/fv is an integer, the shutter may be set to a shutter speed with an exposure time of N/100 (seconds) under the illumination of a fluorescent lamp.

The above-described embodiment shows a case in which the digital signal processing section 20 including the flicker reduction section 25 is formed by hardware. Alternatively, a part or the entirety of the flicker reduction section 25 or the digital signal processing section 20 may be formed by software.

In addition, the present invention can also be applied to an imaging apparatus using an XY address scanning-type imaging device other than a CMOS imaging device.

As has thus been described, according to the present invention, fluorescent-lamp flicker components can be reduced regardless of the combination of the power-supply frequency and the vertical synchronization frequency of the imaging apparatus without detecting the frequency of the power supply for driving the fluorescent lamp, and also, a high-speed shutter required for electronic camera-shake correction can be realized.

What is claimed is:

1. An imaging apparatus comprising:
   an XY address scanning-type imaging device; and
   a controller for controlling the electronic shutter speed,
   wherein each time when a brightness and a color temperature of a subject imaged by the imaging apparatus have a variation greater than a predetermined amount, the controller implements a detecting mode for detecting a presence of a fluorescent-lamp illumination,
   wherein each time when the imaging apparatus is turned on, the controller implements the detecting mode for detecting the presence of the fluorescent-lamp illumination,
   wherein the controller determines whether a photographic environment of the imaging apparatus is indoor or outdoor, and when an outdoor photographic environment is determined, the controller turns off the detecting mode;
   wherein, when a set vertical synchronization frequency of the imaging apparatus is denoted as fv (Hz) and N is a positive integer, in a case where 120/fv is an integer, said controller sets said electronic shutter speed to an electronic shutter speed at which the exposure time becomes N/120 seconds, and in a case where 100/fv is an integer, said controller sets said electronic shutter speed to an electronic shutter speed at which the exposure time becomes N/100seconds, and
   wherein the controller alternatively increases or decrease each vertical period by a same period upon detecting a photographic environment of the image apparatus.

2. An imaging apparatus according to claim 1,
   wherein, when electronic camera-shake correction is to be performed, said controller sets N to a value in the range where the exposure time is shorter than 1/fv seconds.

3. An imaging apparatus according to claim 1,
   wherein, when electronic camera-shake correction is to be performed, when the luminance of a subject is higher than or equal to a threshold value, said controller sets N to a value in the range where the exposure time is shorter than 1/fv seconds, and when the luminance of the subject is lower than the threshold value, said controller sets N to a value at which the exposure time becomes 1/fv seconds.

4. An imaging apparatus according to claim 1,
   wherein, when electronic camera-shake correction is not to be performed, said controller sets N to a value at which the exposure time becomes 1/fv seconds.

5. An imaging apparatus according to claim 1,
   wherein, when electronic camera-shake correction is not to be performed, when the luminance of a subject is lower than or equal to a threshold value, said controller sets N to a value at which the exposure time becomes 1/fv seconds, and when the luminance of the subject is higher than the threshold value, said controller sets N to a value at which the exposure time becomes shorter than 1/fv seconds.

6. An imaging apparatus according to claim 1,
   wherein said controller further detects whether or not the photographic environment is under the illumination of a fluorescent lamp by driving said imaging apparatus by shifting the vertical period.

7. An imaging apparatus according to claim 1, further comprising:
   an integration section for integrating an input-image signal obtained by photographing a subject by said imaging device over the time of one horizontal period or more;
   a normalization section for normalizing the integration value by said integration section, or the difference value of the integration values in adjacent fields or frames;
   an extraction section for extracting the spectrum of the integration value or the difference value normalized by said normalization section;
   an estimation section for estimating flicker components from the spectrum extracted from said extraction section; and
   a computation section for computing the estimated flicker components and said input image signal so as to cancel out the flicker components estimated by said estimation section.

8. A method for reducing fluorescent-lamp flicker components contained in a video signal obtained by photographing a subject by an XY address scanning-type imaging device under the illumination of a fluorescent lamp, said method comprising, when a set vertical synchronization frequency of an imaging apparatus comprising said imaging device is denoted as fv (Hz) and N is a positive integer:
   a shutter control step of setting a shutter to an electronic shutter speed at which the exposure time becomes N/120 seconds in a case where 120/fv is an integer, and of setting the shutter to an electronic shutter speed at which the exposure time becomes N/100 seconds in a case where 100/fv is an integer; and
   a flicker reduction step of reducing flicker components by estimating flicker components from said video signal and by correcting said video signal in accordance with the estimated result in a state in which the electronic shutter speed is set in said shutter control step,
   wherein each time when a brightness and a color temperature of the subject have a variation greater than a predetermined amount, the shutter control step implements a detecting mode for detecting a presence of a fluorescent-lamp illumination,
   wherein the shutter control step determines whether a photographic environment of the imaging apparatus is indoor or outdoor, and when an outdoor photographic environment is determined, the controller turns off the detecting mode;
   wherein each time when the imaging apparatus is turned on, the shutter control step implements the detecting mode for detecting the presence of the fluorescent-lamp illumination, and wherein the shutter control step alternatively increases or decrease each vertical period by a same period upon detecting a photographic environment of the image apparatus.

9. A flicker reduction method according to claim 8, wherein, in said shutter control step, when electronic camera-shake correction is to be performed, N is set to a value in the range where the exposure time is shorter than 1/fv seconds.

10. A flicker reduction method according to claim 8, wherein, in said shutter control step, when electronic camera-shake correction is to be performed, when the luminance of a subject is higher than or equal to a threshold value, N is set to a value in the range where the exposure time is shorter than 1/fv seconds, and when the luminance of the subject is lower than the threshold value, N is set to a value at which the exposure time becomes 1/fv seconds.

11. A flicker reduction method according to claim 8, wherein, in said shutter control step, when electronic camera-shake correction is not to be performed, N is set to a value at which the exposure time becomes 1/fv seconds.

12. A flicker reduction method according to claim 8, wherein, in said shutter control step, when electronic camera-shake correction is not to be performed, when the luminance of a subject is lower than or equal to a threshold value, N is set to a value at which the exposure time becomes 1/fv seconds, and when the luminance of the subject is higher than the threshold value, N is set to a value at which the exposure time becomes shorter than 1/fv seconds.

13. A flicker reduction method according to claim 8, further comprising the step of detecting whether or not the photographic environment is under the illumination of a fluorescent lamp by driving said imaging apparatus by shifting the vertical period.

14. A flicker reduction method according to claim 8, further comprising:
- an integration step of integrating an input image signal obtained by photographing a subject by said imaging device over the time of one horizontal period or more;
- a normalization step of normalizing the integration value obtained in said integration step, or the difference value of the integration values in adjacent fields or frames;
- an extraction step of extracting the spectrum of the integration value or the difference value, which is normalized in said normalization step;
- an estimation step of estimating flicker components from the spectrum obtained in said extraction step; and
- a computation step of computing flicker components and said input image signal so as to cancel out the flicker components obtained in said estimation step.

* * * * *